US012700365B2

(12) United States Patent
Sin

(10) Patent No.: US 12,700,365 B2
(45) Date of Patent: Aug. 4, 2026

(54) DISPLAY APPARATUS

(71) Applicant: LG Display Co., Ltd., Seoul (KR)

(72) Inventor: Ui Su Sin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/050,338

(22) Filed: Feb. 11, 2025

(65) Prior Publication Data

US 2025/0273150 A1 Aug. 28, 2025

(30) Foreign Application Priority Data

Feb. 26, 2024 (KR) ........................ 10-2024-0027475

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2320/0233* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 11,641,769 B2 * | 5/2023 | Cha | ...................... G09G 3/3258 257/40 | |
| 2021/0003898 A1 * | 1/2021 | Kang | ................ G02F 1/136286 | |
| 2021/0272985 A1 * | 9/2021 | Kim | ...................... G09G 3/3233 | |
| 2021/0391407 A1 * | 12/2021 | Yoon | ...................... G06F 1/1686 | |
| 2022/0013618 A1 * | 1/2022 | Park | ...................... H10K 59/131 | |
| 2022/0366847 A1 * | 11/2022 | An | ........................ G09G 3/2003 | |
| 2023/0162676 A1 * | 5/2023 | Hong | ................... G09G 3/3233 365/230.06 | |
| 2023/0397462 A1 * | 12/2023 | Cho | ................... H10K 59/1213 | |

* cited by examiner

*Primary Examiner* — Dorothy Harris
(74) *Attorney, Agent, or Firm* — Fenwick & West LLP

(57) ABSTRACT

A display apparatus is disclosed. The display apparatus includes a first area including a hole, a second area disposed around the hole, and a pixel disposed in each of the first area and the second area. The pixel includes an initialization voltage line, a first scan signal line, and a capacitor disposed between the initialization voltage line and the first scan signal line. The capacitor in the first area has a capacitance different from a capacitance of the capacitor in the second area.

16 Claims, 12 Drawing Sheets

DISPLAY APPARATUS

CROSS REFERENCE TO RELATED APPLICATION

This application claims the benefit of Republic of Korea Patent Application No. 10-2024-0027475, filed on Feb. 26, 2024, which is hereby incorporated by reference in its entirety.

FIELD OF TECHNOLOGY

The present disclosure relates to a display apparatus.

DISCUSSION OF THE RELATED ART

Image display apparatuses, which render a variety of information on a screen, are core technologies of the information communication age, and are being developed toward further thinness, further lightness, greater portability, and higher performance. As such, display apparatuses, which may be manufactured to have a light and thin structure, are being highlighted.

As concrete examples of such a display apparatus, there are a liquid crystal display (LCD) apparatus, a quantum dot (QD) display apparatus, a field emission display (FED) apparatus, an organic light emitting display (OLED) apparatus, etc.

Recently, disposition of a part of configurations included in a display apparatus has been required to be changed in order to form a hole for disposition of a camera at the display apparatus. For this reason, a problem of a reduction in brightness has occurred in a certain area of the display apparatus.

The inventor of the present disclosure has recognized degradation of image quality in an active area according to a disposition area of a hole at which a camera or a sensor is disposed.

For example, the inventor of the present disclosure has recognized that a load difference between a hole area and an area therearound is generated and, as such, brightness deviation is generated in the resultant display apparatus.

SUMMARY

Accordingly, the present disclosure is directed to a display apparatus that substantially obviates one or more problems due to limitations and disadvantages of the related art. The inventor of the present disclosure has invented a new structure capable of minimizing a reduction in brightness generated between the hole area and the area therearound.

It is an object of the present disclosure to provide a display apparatus capable of preventing a reduction in brightness.

Objects of the present disclosure are not limited to the above-described object, and other objects of the present disclosure not yet described will be more clearly understood by those skilled in the art from the following detailed description.

To achieve these objects and other advantages and in accordance with the purpose of the disclosure, as embodied and broadly described herein, a display apparatus includes a first area including a hole, a second area disposed around the hole, and a pixel disposed in each of the first area and the second area. The pixel may include an initialization voltage line, a first scan signal line, and a capacitor disposed between the initialization voltage line and the first scan signal line. The capacitor in the first area may have a capacitance different from a capacitance of the capacitor in the second area.

In another embodiment of the present disclosure, a display apparatus includes a first area including a hole, a second area disposed around the hole, and a pixel disposed in each of the first area and the second area. The pixel may include a first scan signal line, a driving transistor including a first node, a second node, and a third node, and a capacitor disposed between the second node and the first scan signal line. The capacitor in the first area may have a capacitance different from a capacitance of the capacitor in the second area.

Detailed matters of other embodiments are included in the following detailed description and the accompanying drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

Figure 1:
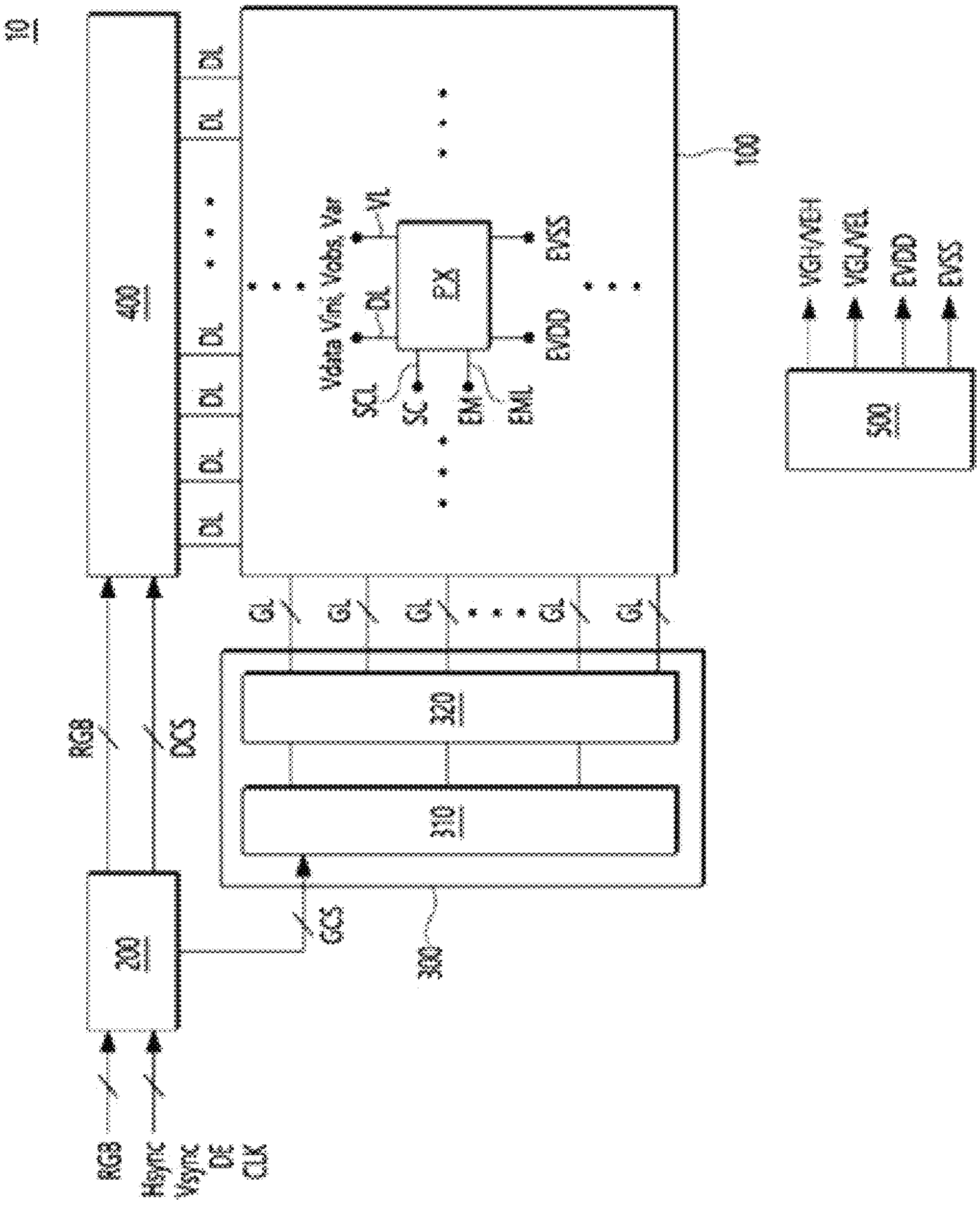
FIG. 1 is a block diagram of a display apparatus according to an embodiment of the present disclosure.

Hereinafter, embodiments of the present disclosure will be described in detail with reference to the accompanying drawings. Throughout the present disclosure, the same reference numerals designate the same constituent elements, respectively.

In the following description of the present disclosure, a detailed description of known technologies or configurations incorporated herein will be omitted when it may obscure the subject matter of the present disclosure. Furthermore, the following terms associated with constituent elements are selected taking into consideration ease of preparation of the disclosure and may differ from the names of the corresponding elements in practice.

The shape, size, ratio, angle, number and the like shown in the drawings to illustrate the embodiments of the present disclosure are only for illustration and are not limited to the contents shown in the drawings. Wherever possible, the same reference numbers will be used throughout the drawings to refer to the same or like parts.

In the following description, detailed descriptions of known technologies associated with the present disclosure may be omitted so as not to unnecessarily obscure the subject matter of the present disclosure.

When terms such as “including”, “having” and “comprising” are used throughout the specification, an additional component may be present, unless “only” is used. A component described in a singular form encompasses components in a plural form unless particularly stated otherwise.

It should be interpreted that the components included in the embodiment of the present disclosure include an error range, although there is no additional particular description thereof.

In describing a variety of embodiments of the present disclosure, when terms for a positional relationship such as “on”, “above”, “under” and “next to” are used, at least one intervening element may be present between two elements unless “immediately” or “directly” is used.

In describing a variety of embodiments of the present disclosure, when a temporal relationship is described, for example, when terms for temporal relationship of events such as “after”, “subsequently”, “next”, and “before” are used, there may also be the case in which the events are not continuous, unless “immediately” or “directly” is used.

In the meantime, although terms including an ordinal number, such as first or second, may be used to describe a variety of constituent elements, the constituent elements are not limited to the terms, and the terms are used only for the purpose of discriminating one constituent element from other constituent elements. Accordingly, a first constituent element may represent a second constituent element within the scope of the present disclosure unless particularly stated otherwise.

The respective features of various embodiments according to the present disclosure can be partially or entirely joined or combined and technically variably related or operated, and the embodiments can be implemented independently or in combination.

Hereinafter, a display apparatus according to an embodiment of the present disclosure will be described with reference to the accompanying drawings.

FIG. 1 is a block diagram of a display apparatus according to an embodiment of the present disclosure.

As shown in FIG. 1, the display apparatus according to the embodiment of the present disclosure includes a display panel 100, a data driving circuit 400, a gate driving circuit 300, a power generator 500, and a timing controller 200.

A plurality of pixels PX may be disposed at the display panel 100. The plurality of pixels PX may be disposed in regions in which a plurality of data lines DL and/or a plurality of gate lines GL intersect each other. Pixels PX disposed on the same horizontal line may constitute one pixel row. The pixels PX disposed in one pixel row may be connected to one gate line GL, and the one gate line GL may include at least one scan line and at least one emission line. For example, each pixel PX may be connected to one data line DL, at least one scan line, and at least one emission line. Of course, embodiments of the present disclosure are not limited to the above-described conditions.

The data driving circuit 400 may drive the data lines DL. The gate driving circuit 300 may drive the gate lines GL. The power generator 500 may supply electric power required for driving of each of the plurality of pixels PX.

The plurality of pixels PX may receive a high-level drive voltage EVDD, a low-level drive voltage EVSS, etc. from the power generator 500 in common. The plurality of pixels PX may receive a bias voltage Vobs and first and second initialization voltages Var and Vini from a power line VL.

A thin film transistor (TFT) or thin film transistors (TFTs) constituting one pixel PX may each be implemented by an oxide TFT including an oxide semiconductor layer. Of course, embodiments of the present disclosure are not limited to the above-described conditions. The oxide TFT may be advantageous in terms of area enlargement of the display panel 100 when electron mobility, process deviations, etc. are taken into consideration. Of course, the present disclosure is not limited to the above-described conditions, and the semiconductor layer of the TFT may be constituted by amorphous silicon, low-temperature polysilicon, polysilicon, or the like.

Each pixel PX may include a light emitting element, for example, an organic light emitting diode (OLED), a driving TFT configured to supply current to the light emitting element, a switching TFT configured to supply a data voltage to the driving TFT, and a storage capacitor configured to store the data voltage supplied to the driving TFT. The storage capacitor may maintain the data voltage for one frame.

Each pixel PX may further include a plurality of TFTs and another storage capacitor in order to compensate for a variation in threshold voltage of the driving TFT.

A touch part may be disposed on the display panel 100. The touch part may include touch sensors. Touch input may be sensed using separate touch sensors or may be sensed through pixels PX. The touch sensors may be disposed on a screen of the display panel 100 in an on-cell type or an add-on type or may be implemented as in-cell type touch sensors built in the display panel 100. Of course, embodiments of the present disclosure are not limited to the above-described conditions.

The timing controller 200 may control driving timings of the data driving circuit 400 and the gate driving circuit 300. The timing controller 200 may re-arrange digital video data RGB input thereto from an outside thereof, to be matched with the resolution of the display panel 100 and may then supply the re-arranged digital video data RGB to the data driving circuit 400.

In addition, the timing controller 200 may generate a data control signal DCS for control of an operation timing of the data driving circuit 400 and a gate control signal GCS for control of an operation timing of the gate driving circuit 300, based on timing signals such as a vertical synchronization signal Vsync, a horizontal synchronization signal Hsync, a dot clock signal CLK, a data enable signal DE, etc.

The timing controller 200 may multiply an input frame frequency by i times, thereby controlling operation timings of the display panel drivers at a frame frequency corresponding to an “input frame frequency×i” Hz (i being a positive integer greater than 0). The input frame frequency is 60 Hz in a national television standards committee (NTSC) system and is 50 Hz in a phase-alternating line (PAL) system. Of course, embodiments of the present disclosure are not limited to the above-described conditions.

The data driving circuit 400 may convert the digital video data RGB input thereto from the timing controller 200 into an analog data voltage based on the data control signal DCS and may then supply the analog data voltage to each data line DL.

The data driving circuit 400 may include at least one source drive IC (SIC). The source drive IC may convert digital video data of an input image into an analog gamma compensation voltage under control of the timing controller 200, thereby generating a data voltage, and may then output the data voltage to the data lines DL. The source drive IC may be mounted on a flexible circuit board, which may be bent, for example, on a chip-on-film (COF) or may be directly bonded to a substrate in a non-active area of the display panel 100 through a chip-on-glass (COG) process. Of course, embodiments of the present disclosure are not limited to the above-described conditions.

COFs may be bonded to a pad area of the display panel 100 and a source PCB (Printed Circuit Board) through an anisotropic conductive film (ACF). Input pins of the COFs may be electrically connected to output terminals (pads) of the source PCB. Output pins of the COFs may be electrically connected to data pads formed at the substrate of the display panel 100 through the ACF. Of course, embodiments of the present disclosure are not limited to the above-described conditions. In another example, the drive ICs of the data driving circuit 400 may be disposed on the display panel 100. For example, the drive ICs may be configured in a chip-on-panel (COP) type.

Although the data driving circuit 400 is shown in FIG. 1 as being singularly disposed at one side of the display panel 100, the data driving circuit 400 is not limited in terms of number and position. For example, the data driving circuit 400 may be constituted by a plurality of integrated circuits (ICs) such that the data driving circuit 400 is disposed at one side of the display panel 100 in a state of being divided into the plurality of ICs.

The gate driving circuit 300 may generate a scan signal and an emission control signal based on the gate control signal GCS. The gate driving circuit 300 may include at least one scan driver 310 and an emission driver 320.

The at least one scan driver 310 may generate a scan signal SC and may supply the scan signal SC to the gate lines GL in a row sequential manner, in order to drive at least one scan line SCL connected to each pixel row. The at least one scan driver 310 may output a scan pulse in response to a start pulse and a shift clock from the timing controller 200 and may then shift the scan pulse in accordance with a shift clock timing.

The emission driver 320 may generate an emission control signal EM in a row sequential manner in order to drive one or more emission lines EML connected to each pixel row and may then supply the emission control signal EM to the emission lines EML. The emission driver 320 may output an emission control signal pulse in response to the start pulse and the shift clock from the timing controller 200 and may then sequentially shift the emission control signal pulse in accordance with the shift clock.

The scan signal SC may include a scan pulse swinging between a gate-on voltage VGL and a gate-off voltage VGH. The emission control signal EM may include an emission control signal pulse swinging between a gate-on voltage VEL and a gate-off voltage VEH. The scan pulse may select pixels PX of a line on which a data voltage Vdata will be written. The emission control signal EM may define an emission time of the pixels PX.

Each gate line GL may supply the scan signal SC and the emission control signal EM to a plurality of pixels PX, and each data line DL may supply the data voltage Vdata to a plurality of pixels PX. In accordance with various embodiments, each gate line GL may include a plurality of scan lines SCL for supply of the scan signal SC and a plurality of emission control signal lines EML for supply of the emission control signal EM. Of course, embodiments of the present disclosure are not limited to the above-described conditions.

The power generator 500, which is a power supplier, may generate DC (Direct Current) power required for driving of a pixel array and the display panel drivers of the display panel 100, using a DC-DC converter. The DC-DC converter may include a charge pump, a regulator, a buck converter, a boost converter, or the like. Of course, embodiments of the present disclosure are not limited to the above-described conditions.

The power supply 500 may receive a DC input voltage from a host system, thereby generating DC voltages such as a gate-on voltage VGL/VEL, a gate-off voltage VGH/VEH, a high-level drive voltage EVDD, a low-level drive voltage EVSS, etc. Of course, embodiments of the present disclosure are not limited to the above-described conditions.

The gate-on voltage VGL/VEL and the gate-off voltage VGH/VEH may be supplied to the level shifter and the gate driving circuit 300. The high-level drive voltage EVDD and the low-level drive voltage EVSS may be supplied to the pixels PX in common.

The plurality of pixels PX of the display panel 100 may include at least a first pixel, a second pixel, and a third pixel. The first pixel, the second pixel, and the third pixel may emit light of different colors, respectively. For example, the first pixel may be a red pixel, the second pixel may be a green pixel, and the third pixel may be a blue pixel. Of course, embodiments of the present disclosure are not limited to the above-described conditions.

The plurality of pixels PX may have an equal size or may have different sizes, respectively. The first pixel, the second pixel, and the third pixel may be configured to have different sizes, taking into consideration lifespans, color balance, etc. of the light emitting elements (for example, OLEDs) respectively included in the first pixel, the second pixel, and the third pixel. Of course, embodiments of the present disclosure are not limited to the above-described conditions.

The display apparatus according to the present disclosure may employ variable refresh rate (VRR) technology for varying a driving frequency in order to achieve low power consumption.

For example, the timing controller 200 may generate a signal enabling the pixel PX to be driven at various refresh rates. For example, the timing controller 200 may generate signals associated with driving of the pixel PX in order to enable the pixel PX to be driven in a variable refresh rate (VRR) mode or in a state of being switchable between a first refresh rate and a second refresh rate. For example, the timing controller 200 may drive the pixel PX at various refresh rates by simply varying a rate of a clock signal, generating a synchronization signal, for generation of a horizontal blank or a vertical blank, or driving the gate driving circuit 300 in a mask manner.

Accordingly, each pixel PX may be configured to be driven in accordance with an anode reset frame, for variation of the driving frequency, and to supply a reset voltage VAR for driving thereof according to the anode reset frame.

In addition, the display apparatus may be configured to supply an initialization voltage Vini for initialization of a driving transistor and a bias voltage Vobs capable of adjusting a gate-source voltage Vgs flowing through the driving transistor, thereby reducing hysteresis of the driving transistor.

Figure 2:
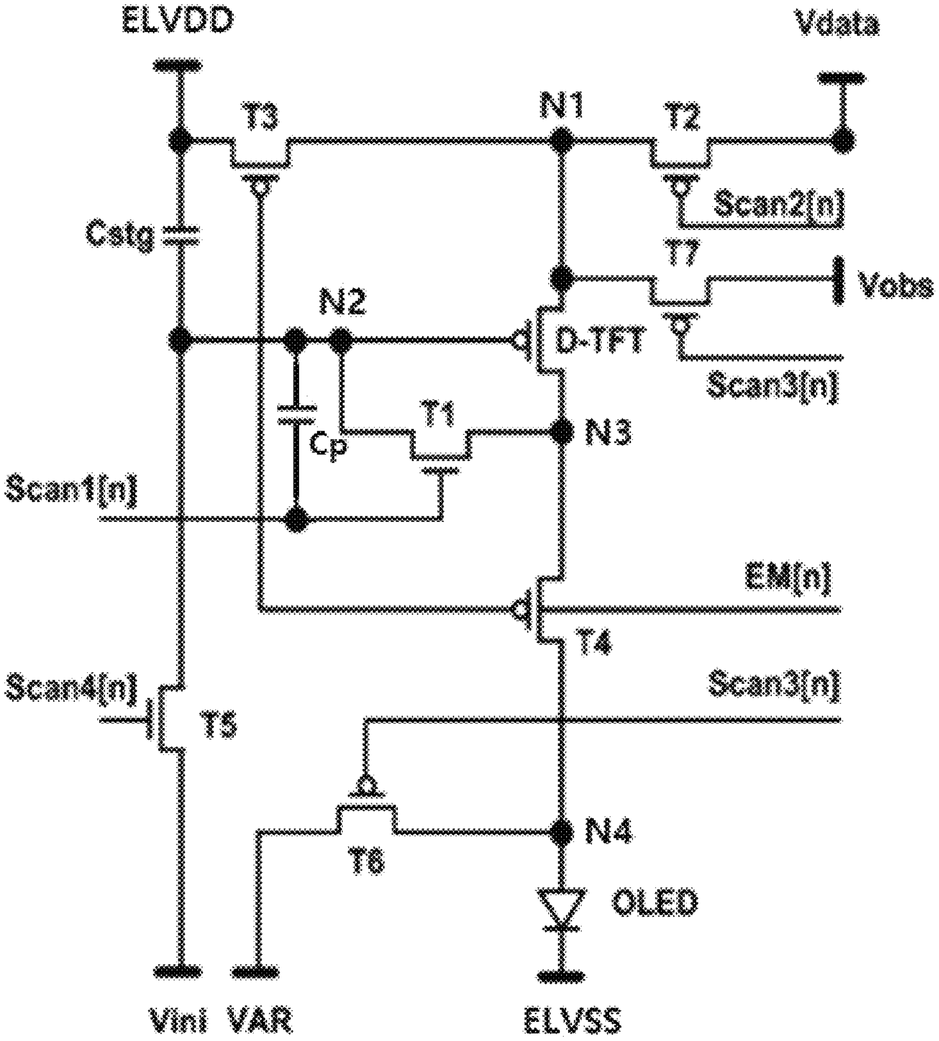
FIG. 2 is a circuit diagram of each pixel included in the display apparatus according to an embodiment of the present disclosure.
Figure 3:
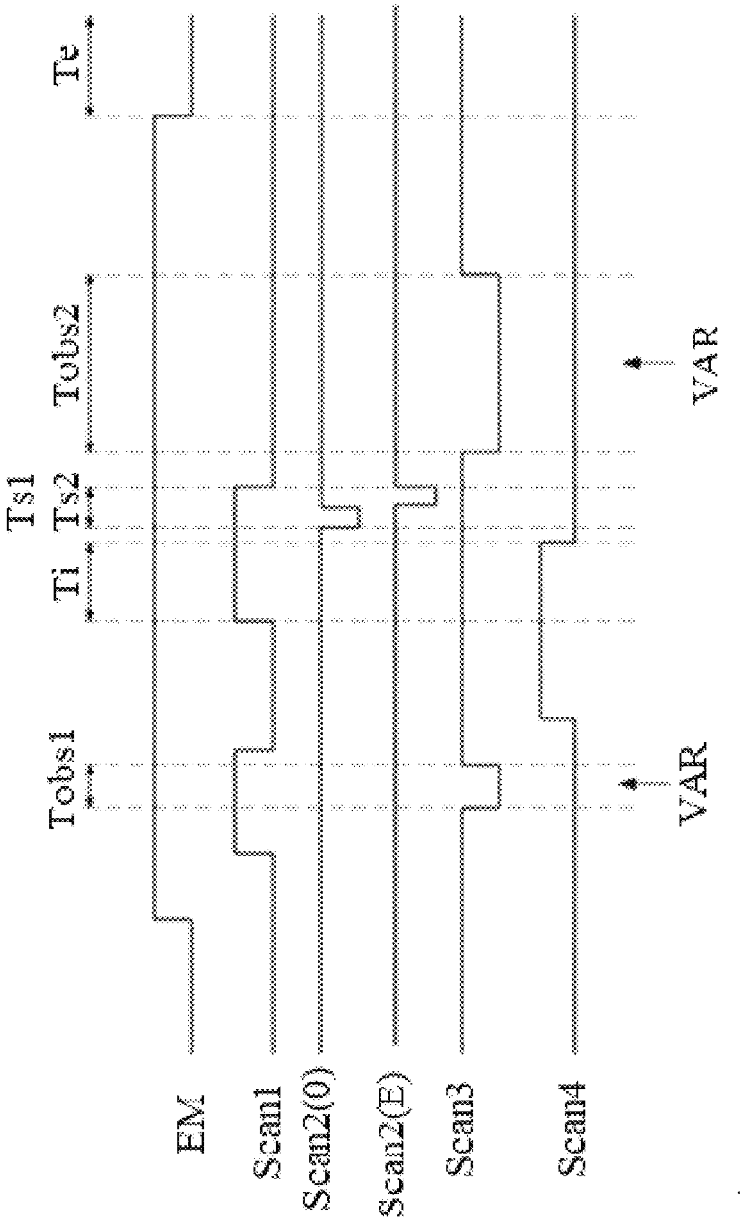
FIG. 3 is an illustrative diagram of driving waveforms of the display panel based on the pixel shown in FIG. 2 according to an embodiment of the present disclosure.

FIG. 2 is a circuit diagram of each pixel included in the display apparatus according to an embodiment of the present disclosure. FIG. 3 is an illustrative diagram of driving waveforms of the display panel based on the pixel shown in FIG. 2 according to an embodiment of the present disclosure.

As shown in FIG. 2, each pixel PX may include a pixel driving circuit and an emission part.

The pixel driving circuit may include first to seventh transistors T1 to T7, a storage capacitor Cstg, and a driving transistor D-TFT. Of course, embodiments of the present disclosure are not limited to the above-described conditions. The emission part may include a light emitting element OLED.

The first to seventh transistors T1 to T7 and the driving transistor D-TFT may be constituted by transistors of different types. For example, one of the first to seventh transistors T1 to T7 and the driving transistor D-TFT may be a transistor employing an oxide semiconductor as an active layer thereof. Of course, embodiments of the present disclosure are not limited to the above-described conditions. Since an oxide semiconductor material exhibits low off-current, the oxide semiconductor material may be suitable for a switching transistor maintaining a short turn-on time and a long turn-off time. In another example, another one of the first to seventh transistors T1 to T7 and the driving transistor D-TFT may be a transistor employing low-temperature polysilicon (LTPS) as an active layer thereof. Since a polysilicon material exhibits high mobility, thereby exhibiting low power consumption and excellent reliability, the polysilicon material may be suitable for the driving transistor D-TFT. The active layer may be a semiconductor layer, without being limited thereto.

Each of the first to seventh transistors T1 to T7 and the driving transistor D-TFT may be an N-type transistor or a P-type transistor. In an N-type transistor, carriers are electrons and, as such, electrons may flow from a source electrode to a drain electrode, and current may flow from the drain electrode to the source electrode. In a P-type transistor, carriers are holes and, as such, holes may flow from a source electrode to a drain electrode, and current may flow from the source electrode to the drain electrode. For example, one of the first to seventh transistors T1 to T7 and the driving transistor D-TFT may be an N-type transistor, whereas another one of the first to seventh transistors T1 to T7 and the driving transistor D-TFT may be a P-type transistor.

Although the pixel driving circuit may include the driving transistor D-TFT, the first to seventh transistors T1 to T7, and the storage capacitor Cstg, embodiments of the present disclosure are not limited thereto.

The driving transistor D-TFT may include a first node N1, a second node N2, and a third node N3. In the driving transistor D-TFT, the second node N2 may be a gate node, the first node N1 may be a source node or a drain node, and the third node N3 may be a drain node or a source node. For convenience of description, the following description will be given in conjunction with an example in which, in the driving transistor D-TFT, the second node N2 is a gate node, the first node N1 is a source node, and the third node N3 is a drain node. Of course, embodiments of the present disclosure are not limited to the above-described conditions.

A gate electrode of the driving transistor D-TFT may be connected to the second node N2, and a first electrode of the driving transistor D-TFT may be connected to the first node N1. A second electrode of the driving transistor D-TFT may be connected to the third node N3. The driving transistor D-TFT may be connected between the first node N1 and the third node N3. The driving transistor D-TFT may be controlled in accordance with a voltage of the second node N2 to control current flowing through the light emitting element OLED.

The first transistor T1 may be connected between the second node N2 and the third node N3. The first transistor T1 may be controlled by a first scan signal Scan1[*n*] to enable switching between the second node N2 and the third node N3.

The second transistor T2 may be connected to the first node N1. The second transistor T2 may be controlled by a second scan signal Scan2[*n*] to supply a data voltage Vdata to the first node N1. For example, the second transistor T2 may be connected between the first node N1 and a data voltage line.

The third transistor T3 may be connected to the first node N1. The third transistor T3 may be controlled by an emission control signal EM[n] to supply a high-level drive voltage ELVDD to the first node N1 through a high-level drive voltage line. For example, the third transistor T3 may be connected between the first node N1 and the high-level drive voltage line.

The fourth transistor T4 may be connected between the third node N3 and a fourth node N4. The fourth transistor T4 may be controlled by the emission control signal EM[n] to enable switching between the third node N3 and the fourth node N4.

The fifth transistor T5 may be connected to the second node N2. The fifth transistor T5 may be controlled by a fourth scan signal Scan4[*n*] to supply an initialization voltage Vini to the second node N2. When the fifth transistor T5 is turned on, residual charges present at the gate electrode of the driving transistor D-TFT and a second electrode of the capacitor Cstg, which are connected to the second node N2, may be initialized. For example, the fifth transistor T5 may be connected between the second node N2 and an initialization voltage line.

The sixth transistor T6 may be connected to the fourth node N4. The sixth transistor T6 may be controlled by a third scan signal Scan3[*n*] to supply an anode reset voltage VAR to the fourth node N4. When the sixth transistor T6 is turned on, residual charges present at an anode of the light emitting element OLED may be initialized. For example, the sixth transistor T6 may be connected between the fourth node and a reset line or an anode reset line.

The seventh transistor T7 may be connected to the first node N1. The seventh transistor T7 may be controlled by the third scan signal Scan3[*n*] to supply a bias voltage Vobs to the first node N1. The bias voltage Vobs may adjust a gate-source voltage Vgs flowing through the driving transistor D-TFT to reduce hysteresis of the driving transistor D-TFT. For example, a threshold voltage Vth of the driving transistor D-TFT may be varied through application of the bias voltage Vobs. For example, the seventh transistor T7 may be connected between the first node N1 and a bias voltage line.

The storage capacitor Cstg may be connected between a high-level drive voltage terminal configured to supply the high-level drive voltage ELVDD and the second node N2.

The storage capacitor Cstg may store the data voltage Vdata. For example, the storage capacitor Cstg may store the data voltage Vdata for one frame.

The light emitting element OLED may include the anode and a cathode. The anode of the light emitting element OLED may be connected to the fourth node N4. The cathode of the light emitting element OLED may be connected to a low-level drive voltage line configured to supply the low-level drive voltage ELVSS.

The light emitting element OLED may include one of an organic emission layer, an inorganic emission layer, and a quantum dot emission layer. Otherwise, the light emitting element OLED may include a stack or mixture structure of an organic emission layer (or an inorganic emission layer) and a quantum dot emission layer. Of course, embodiments of the present disclosure are not limited to the above-described conditions. For example, the light emitting element OLED may be an organic light emitting element including an anode, an organic layer, and a cathode. In another example, the light emitting element OLED may be constituted by a micro light emitting diode (micro-LED), a mini-LED, a quantum dot light emitting diode QLED including quantum dots (QDs), or the like. Of course, embodiments of the present disclosure are not limited to the above-described conditions.

The light emitting element OLED may output light corresponding to one of various colors such as red, green, and blue, or may output white light. Of course, embodiments of the present disclosure are not limited to the above-described conditions.

Although FIG. 2 illustrates an example in which each of the first transistor T1 and the fifth transistor T5 is implemented to be in an n type based on oxide semiconductor, and each of the second transistor T2, the third transistor T3, the fourth transistor T4, the sixth transistor T6, the seventh transistor T7, and the driving transistor D-TFT is implemented to be in a p type based on a polycrystalline semiconductor, embodiments of the present disclosure are not limited thereto.

In the pixel circuit diagram as shown in FIG. 2, a parasitic capacitor Cp may be formed between a scan line configured to supply the first scan signal Scan1[*n*] to the first transistor T1 and the second node N2 configured to supply the initialization voltage Vini due to overlap between the scan line and the second node N2.

As shown in FIGS. 2 and 3, the display apparatus according to the embodiment of the present disclosure may operate for a refresh period in an order of a first bias period Tobs1, an initialization period Ti, a first sampling period Ts1, a second sampling period Ts2, and a second bias period Tobs2. Of course, embodiments of the present disclosure are not limited to the above-described conditions.

FIG. 3 shows the case in which an odd pixel and an even pixel are implemented to have structures sharing an odd scan driver and an even scan driver included in at least one scan driver 310, respectively. Accordingly, the second scan signal Scan2 may include a second odd scan signal Scan2(O) and a second even scan signal Scan2(E).

The first bias period Tobs1 may be a period in which a bias voltage is applied to the first electrode (or the first node N1) of the driving transistor D-TFT. During the first bias period Tobs1, each of the emission control signal EM, the first scan signal Scan1, the second odd scan signal Scan2(O), and the second even scan signal Scan2(E) may be applied at a high voltage, and each of the third scan signal Scan3 and the fourth scan signal Scan4 may be applied at a low voltage. The anode reset voltage VAR may be applied during the first bias period Tobs1.

The initialization period Ti may be a period in which the gate electrode of the driving transistor D-TFT is initialized. During the initialization period Ti, each of the emission control signal EM, the first scan signal Scan1, the second odd scan signal Scan2(O), the second even scan signal Scan2(E), the third scan signal Scan3, and the fourth scan signal Scan4 may be applied at a high voltage.

Each of the first sampling period Ts1 and the second sampling period Ts2 may be a period in which the threshold voltage of the driving transistor D-TFT included in each of an odd sub-pixel and an even sub-pixel is sampled. During the first sampling period Ts1, each of the emission control signal EM, the first scan signal Scan1, the second even scan signal Scan2(E), and the third scan signal Scan3 may be applied at a high voltage, and each of the second odd scan signal Scan2(O) and the fourth scan signal Scan4 may be applied at a low voltage. During the second sampling period Ts2, each of the emission control signal EM, the first scan signal Scan1, the second odd scan signal Scan2(O), and the third scan signal Scan3 may be applied at a high voltage, and each of the second even scan signal Scan2(E) and the fourth scan signal Scan4 may be applied at a low voltage.

The second bias period Tobs2 may be a period in which a bias voltage is applied to the first electrode (or the first node N1) of the driving transistor D-TFT. During the second bias period Tobs2, each of the emission control signal EM, the second odd scan signal Scan2(O), and the second even scan signal Scan2(E) may be applied at a high voltage, and each of the first scan signal Scan1, the third scan signal Scan3, and the fourth scan signal Scan4 may be applied at a low voltage. The anode reset voltage VAR may be applied during the second bias period Tobs2.

The display apparatus according to the embodiment of the present disclosure may have an emission period Te after the refresh period is completed. During the emission period Te, each of the first scan signal Scan1, the fourth scan signal Scan4, and the emission control signal EM may be applied at a low voltage, and each of the second odd scan signal Scan2(O), the second even scan signal Scan2(E), and the third scan signal Scan3 may be applied at a high voltage.

Figure 4:
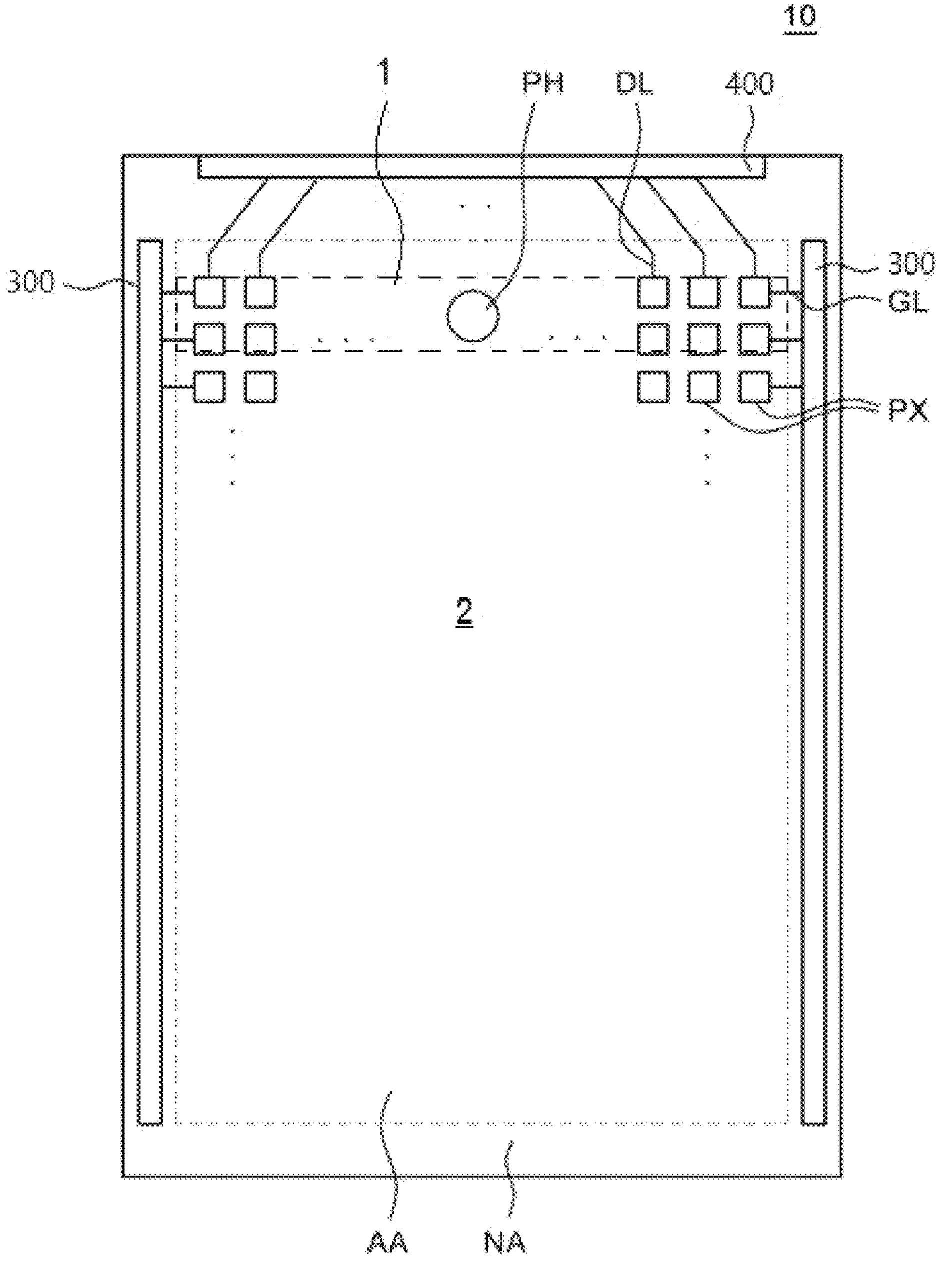
FIG. 4 is a plan view of a display apparatus according to an embodiment of the present disclosure.
Figure 5:
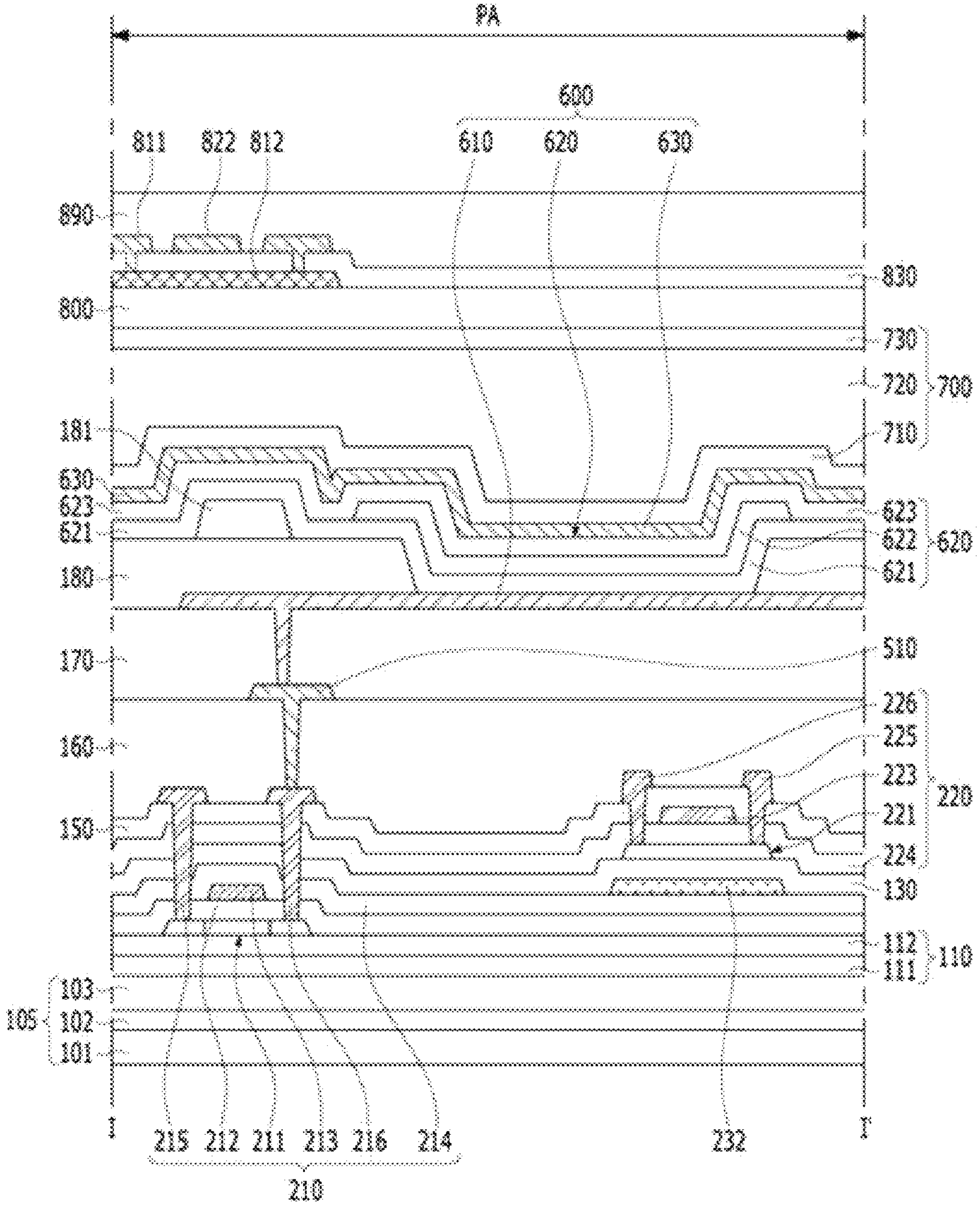
FIG. 5 is a cross-sectional view of an active area of the display apparatus according to an embodiment of the present disclosure.

FIG. 4 is a plan view of a display apparatus according to an embodiment of the present disclosure. FIG. 5 is a cross-sectional view of an active area of the display apparatus according to an embodiment of the present disclosure.

Referring to FIG. 4, the display apparatus according to the embodiment of the present disclosure, which is designated by reference numeral "10", may include an active area AA and a non-active area NA.

The active area AA may include a plurality of pixels PX and may display an image. The active area AA may include a first area 1 and a second area 2. The first area 1 may include a hole PH. The first area 1 may be a hole-in-display (HID) area, without being limited thereto. The second area 2 may be disposed around the first area 1. The second area 2 may not include a hole. The second area 2 may be a normal area, without being limited thereto.

The non-active area NA may be disposed around the active area AA. The non-active area NA may not display an image.

Referring to FIGS. 4 and 5, Each of the plurality of pixels PX disposed in the active area AA may be constituted by a data line DL and a gate line GL, and may include a light emitting element 600, first and second transistors 210 and 220, and a touch part 811-812-822. As the transistors 210 and 220 of each pixel PX are driven by a gate driving circuit 300, the light emitting element 600 emits light to render an image.

The first area 1 may include at least one hole PH. The second area 2 may be an area, except for the first area 1, which does not include a hole. The hole PH may be a through hole, without being limited thereto.

For example, the first area 1 may be disposed at a central portion of the active area AA and at one side of the active area AA. The first area 1 may have a planar shape including a polygon. Of course, embodiments of the present disclosure are not limited to the above-described conditions.

A plurality of gate lines GL and a plurality of data lines DL disposed in the active area AA may bypass the hole PH in the first area 1. Accordingly, the planar shape of the first area 1 may be varied in accordance with arrangements or shapes of the bypassing gate lines GL and the bypassing data lines DL.

In the non-active area NA, the gate driving circuit 300, which is configured to apply a gate voltage to the plurality of pixels PX through gate lines GL, and a data driving circuit 400 configured to apply a data voltage to the plurality of pixels PX through data lines DL may be disposed.

In addition, one or more dams may also be disposed in the first area 1 in order to prevent a foreign matter compensation layer from being excessively coated.

Hereinafter, a cross-sectional structure of the active area AA will be described in detail with reference to FIG. 5.

The display apparatus according to the embodiment of the present disclosure may include a substrate 105. The substrate 105 may include an insulating material. For example, the substrate 105 may include glass or plastic. Of course, embodiments of the present disclosure are not limited to the above-described conditions. The substrate 105 may have a multilayer structure. For example, the substrate 105 may have a structure in which a first substrate layer 101, a substrate insulating layer 102, and a second substrate layer 103 are sequentially disposed or stacked. Of course, embodiments of the present disclosure are not limited to the above-described conditions. The second substrate layer 103 may include the same material as that of the first substrate layer 101, but embodiments of the present disclosure are not limited thereto. For example, the first substrate layer 101 and the second substrate layer 103 may include a polymer material such as polyimide (PI). Of course, embodiments of the present disclosure are not limited to the above-described conditions. The substrate insulating layer 102 may include an insulating material. Accordingly, in the display apparatus according to the embodiment of the present disclosure, the substrate 105 may have flexibility. As a result, in the display apparatus according to the embodiment of the present disclosure, damage to the substrate 105 caused by bending stress may be prevented.

The substrate 105 may include an active area, a bending area, and a pad area, but embodiments of the present disclosure are not limited thereto. An image to be provided to the user may be rendered in the active area AA. For example, the active area AA may include a plurality of pixel areas PA. Each pixel area PA may render a particular color. For example, the light emitting element 600 may be disposed in each pixel area PA. The light emitting element 600 may emit light representing a particular color. For example, the light emitting element 600 may include a first electrode 610, an emission layer 620, and a second electrode 630 stacked on the substrate 105.

The first electrode 610 may include a conductive material. The first electrode 610 may be constituted by a material capable of having high reflectivity, but embodiments of the present disclosure are not limited thereto. For example, the first electrode 610 may include a metal such as aluminum (Al) or silver (Ag), but embodiments of the present disclosure are not limited thereto. The first electrode 610 may have a multilayer structure, but embodiments of the present disclosure are not limited thereto. The first electrode 610 may have a multilayer structure. For example, the first electrode 610 may have a structure in which a reflective electrode made of a metal is interposed between transparent electrodes made of a transparent conductive material such as indium tin oxide (ITO) or indium zinc oxide (IZO). Of course, embodiments of the present disclosure are not limited to the above-described conditions.

The emission layer 620 may generate light of a brightness corresponding to a voltage difference between the first electrode 610 and the second electrode 630. For example, the emission layer 620 may include an emission material layer (EML) 622 including an emission material. The emission material may include an organic material, an inorganic material, or a hybrid material. For example, the display apparatus according to the embodiment of the present disclosure may be an organic light emitting display apparatus in which an emission layer 620 includes an emission material layer 622 made of an organic material. Of course, embodiments of the present disclosure are not limited to the above-described conditions, and the emission layer 620 may include an inorganic emission material. For example, the emission layer 620 may be constituted by a material for manufacture of a quantum dot light emitting diode (QLED), a micro-LED, a mini-LED, or the like. Of course, embodiments of the present disclosure are not limited to the above-described conditions.

The emission layer 620 may have a multilayer structure, but embodiments of the present disclosure are not limited thereto. For example, the emission layer 620 may include at least one of a first common layer 621 disposed between the first electrode 610 and the emission material layer 622 or a second common layer 623 disposed between the emission material layer 622 and the second electrode 630, but embodiments of the present disclosure are not limited thereto. Each of the first common layer 621 and the second common layer 623 may include at least one of a hole injection layer (HIL), a hole transport layer (HTL), a hole blocking layer (HBL), an electron blocking layer (EBL), an electron transport layer (ETL), or an electron injection layer (EIL). Of course, embodiments of the present disclosure are not limited to the above-described conditions. For example, in the display apparatus according to the embodiment of the present disclosure, the first common layer 621 may include at least one of a hole injection layer (HIL), an electron blocking layer (EBL), or a hole transport layer (HTL), and the second common layer 623 may include at least one of an electron transport layer (ETL), a hole blocking layer (HBL), or an electron injection layer (EIL). Of course, embodiments of the present disclosure are not limited to the above-described conditions.

The second electrode 630 may include a conductive material. The second electrode 630 may include a material different from that of the first electrode 610, but embodiments of the present disclosure are not limited thereto. For example, the second electrode 630 may be a transparent electrode made of a transparent conductive material such as indium tin oxide (ITO) or indium zinc oxide (IZO). Of course, embodiments of the present disclosure are not limited to the above-described conditions. The second electrode 630 may have higher transmittance than that of the first electrode 610. In the display apparatus according to the embodiment of the present disclosure, accordingly, light generated by the emission layer 620 may be emitted through the second electrode 630.

A driving circuit may be disposed in each pixel area PA. The driving circuit may generate drive current to be provided to the light emitting element 600. The driving circuit may be electrically connected to signal lines GL, DL, ELVDD, and ELVSS. For example, each pixel area PA may be constituted by the signal lines GL, DL, ELVDD, and ELVSS, but embodiments of the present disclosure are not limited thereto. The signal lines GL, DL, ELVDD, and ELVSS may transmit various signals for rendering of an image. For example, the signal lines GL, DL, ELVDD, and ELVSS may include a gate line GL configured to apply a gate signal, a data line DL configured to apply a data signal, and drive voltage supply lines ELVDD and ELVSS configured to supply drive voltages, but embodiments of the present disclosure are not limited thereto. The driving circuit may generate drive current corresponding to a data signal in accordance with a gate signal. Operation of the light emitting element 600 may be maintained for one frame. For example, the driving circuit may include a first thin film transistor 210 and a second thin film transistor 220, but embodiments of the present disclosure are not limited thereto.

The first thin film transistor 210 may be electrically connected to the light emitting element 600. The first thin film transistor 210 may supply, to the light emitting element 600, drive current corresponding to a data signal. For example, the first thin film transistor 210 may be disposed between the light emitting element 600 and one of the drive voltage supply lines ELVDD and ELVSS. The first thin film transistor 210 may include a first semiconductor layer 211, a first gate electrode 213, a first source electrode 215, and a first drain electrode 216.

The first semiconductor layer 211 may be disposed near the substrate 105. The first semiconductor layer 211 may include a semiconductor material, but embodiments of the present disclosure are not limited thereto. The first semiconductor layer 211 may include a polycrystalline semiconductor, but embodiments of the present disclosure are not limited thereto. For example, the first semiconductor layer 211 may include polysilicon or low-temperature polysilicon (LTPS), but embodiments of the present disclosure are not limited thereto. In another example, the first semiconductor layer 211 may include an oxide semiconductor. The first semiconductor layer 211 may include a first source region, a first drain region, and a first channel region. The first channel region may be disposed between the first source region and the first drain region. The first channel region may have lower electrical conductivity than that of the first source region and the first drain region. For example, the first source region and the first drain region may include a conductive impurity having a greater content than that of the first channel region.

A first insulating layer 212 may be disposed on the first semiconductor layer 211. The first insulating layer 212 may extend outwards beyond the first semiconductor layer 211. For example, a side surface of the first semiconductor layer 211 may be covered by the first insulating layer 212. The first insulating layer 212 may include an insulating material. For example, the first insulating layer 212 may include silicon oxide (SiOx) and/or silicon nitride (SiNx), but embodiments of the present disclosure are not limited thereto. The silicon oxide (SiOx) may include silicon dioxide ($SiO_2$). The first insulating layer 212 may include a material having high permittivity. For example, the first insulating layer 212 may include a material such as hafnium oxide (HfO), but embodiments of the present disclosure are not limited thereto. The first insulating layer 212 may be an interlayer insulating layer, but embodiments of the present disclosure are not limited thereto.

The first gate electrode 213 may be disposed on the first insulating layer 212. The first gate electrode 213 may include a conductive material. For example, the first gate electrode 213 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The first gate electrode 213 may be insulated from the first semiconductor layer 211 by the first insulating layer 212. The first gate electrode 213 may overlap with the first channel region of the first semiconductor layer 211. For example, the first channel region of the first semiconductor layer 211 may have electrical conductivity corresponding to a voltage applied to the first gate electrode 213.

A second insulating layer 214 may be disposed on the first gate electrode 213. The second insulating layer 214 may extend outwards beyond the first gate electrode 213. For example, a side surface of the first gate electrode 213 may be covered by the second insulating layer 214. The second insulating layer 214 may extend along the first insulating layer 212. The second insulating layer 214 may include an insulating material. For example, the second insulating layer 214 may include silicon oxide (SiOx), but embodiments of the present disclosure are not limited thereto. The second insulating layer 214 may be a gate insulating layer, but embodiments of the present disclosure are not limited thereto.

The first source electrode 215 may be disposed on the second insulating layer 214. The first source electrode 215 may be insulated from the first gate electrode 213 by the second insulating layer 214. The first source electrode 215 may include a material different from that of the first gate electrode 213, but embodiments of the present disclosure are not limited thereto. The first source electrode 215 may include a conductive material. For example, the first source electrode 215 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The first source electrode 215 may be electrically connected to the first source region of the first semiconductor layer 211.

The first drain electrode 216 may be disposed on the second insulating layer 214. The first drain electrode 216 may include a conductive material. For example, the first drain electrode 216 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The first drain electrode 216 may be insulated from the first gate electrode 213 by the second insulating layer 214. The first drain electrode 216 may include a material different from that of the first gate electrode 213, but embodiments of the present disclosure are not limited thereto. For example, the first drain electrode 216 may include the same material as that of the first source electrode 215, but embodiments of the present disclosure are not limited thereto. The first drain electrode 216 may be formed using the same process as that of the first source electrode 215, but embodiments of the present disclosure are not limited thereto. The first drain electrode 216 may be electrically connected to the first drain region of the first semiconductor layer 211. The first drain electrode 216 may be spaced apart from the first source electrode 215.

Concrete positions of the first source electrode 215 and the first drain electrode 216 will be described later.

The second thin film transistor 220 may be electrically connected to the first thin film transistor 210. The second thin film transistor 220 may transmit a data signal to the first gate electrode 213 of the first thin film transistor 210 in accordance with a scan signal. For example, the second thin film transistor 220 may be disposed between the data line DL and the first gate electrode 213 of the first thin film transistor 210. The structure of the second thin film transistor 220 may be identical to the structure of the first thin film transistor 210, but embodiments of the present disclosure are not limited thereto. For example, the second thin film transistor 220 may include a second semiconductor layer 221, a second gate electrode 223, a second source electrode 225, and a second drain electrode 226.

The second semiconductor layer 221 may include a semiconductor material. The second semiconductor layer 221 may include a material identical to or different from that of the first semiconductor layer 211. For example, the second semiconductor layer 221 may include oxide semiconductor such as indium-gallium-zinc oxide (IGZO), but embodiments of the present disclosure are not limited thereto. In another example, the second semiconductor layer 221 may include polysilicon or low-temperature polysilicon (LTPS), but embodiments of the present disclosure are not limited thereto.

The second semiconductor layer 221 may be disposed on a layer different from that of the first semiconductor layer 211. For example, a first protective layer 130 may be disposed on the second insulating layer 214, and the second semiconductor layer 221 may be disposed on the first protective layer 130. The first protective layer 130 may include silicon oxide (SiOx), silicon nitride (SiNx) or the like, but embodiments of the present disclosure are not limited thereto. In the display apparatus according to the embodiment of the present disclosure, accordingly, damage to the second semiconductor layer 221 caused by a formation process for the first semiconductor layer 211 may be prevented or at least reduced.

The second semiconductor layer 221 may include a second source region, a second drain region, and a second channel region. The second channel region may be disposed between the second source region and the second drain region. The second source region and the second drain region may have a lower resistance than that of the second channel region. For example, the second source region and the second drain region may include a region of oxide semiconductor treated to have conductivity. The second channel region may be a region of oxide semiconductor not treated to have conductivity.

A fourth insulating layer 224 may be disposed on the second semiconductor layer 221. The fourth insulating layer 224 may include an insulating material. The fourth insulating layer 224 may include the same material as that of the first insulating layer 212, but embodiments of the present disclosure are not limited thereto. For example, the fourth insulating layer 224 may have a multilayer structure, but embodiments of the present disclosure are not limited thereto.

The second gate electrode 223 may be disposed on the fourth insulating layer 224. For example, the second gate electrode 223 may overlap with the second channel region of the second semiconductor layer 221. The second gate electrode 223 may include a conductive material. For example, the second gate electrode 223 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The second gate electrode 223 may include the same material as that of the first gate electrode 213, but embodiments of the present disclosure are not limited thereto. The second gate electrode 223 may be insulated from the second semiconductor layer 221 by the fourth insulating layer 224. For example, the second channel region of the second semiconductor layer 221 may have electrical conductivity corresponding to a voltage applied to the second gate electrode 223.

A second protective layer 150 may be disposed on the fourth insulating layer 224. The second protective layer 150 may include silicon oxide (SiOx), silicon nitride (SiNx), or the like, but embodiments of the present disclosure are not limited thereto.

The second source electrode 225 may be disposed on the second protective layer 150. The second source electrode 225 may include a conductive material. For example, the second source electrode 225 may include aluminum (Al), chromium (Cr), copper (Cu), titanium (Ti), molybdenum (Mo), tungsten (W), or an alloy thereof, but embodiments of the present disclosure are not limited thereto. The second source electrode 225 may include the same material as that of the first source electrode 215, but embodiments of the present disclosure are not limited thereto. The second source electrode 225 may be insulated from the second gate electrode 223 by the fourth insulating layer 224. The second source electrode 225 may include a material different from that of the second gate electrode 223, but embodiments of the present disclosure are not limited thereto. The second source electrode 225 may be electrically connected to the second source region of the second semiconductor layer 221. For example, the fourth insulating layer 224 and the second protective layer 150 may include a second source contact hole configured to partially expose the second source region of the second semiconductor layer 221. The second source electrode 225 may include a region overlapping with the second source region of the second semiconductor layer 221. For example, the second source electrode 225 may contact the second source region of the second semiconductor layer 221 within the second source contact hole.

The second drain electrode 226 may be disposed on the second protective layer 150. The second drain electrode 226 may include a conductive material. For example, the second drain electrode 226 may include a single layer or a double layer including one of aluminum (Al), chromium (Cr), copper (Cu), titanium (Ti), molybdenum (Mo), and tungsten (W) or an alloy thereof, but embodiments of the present disclosure are not limited thereto. The second drain electrode 226 may include the same material as that of the first drain electrode 216, but embodiments of the present disclosure are not limited thereto. The second drain electrode 226 may be insulated from the second gate electrode 223 by the fourth insulating layer 224. The second drain electrode 226 may include a material different from that of the second gate electrode 223, but embodiments of the present disclosure are not limited thereto. For example, the second drain electrode 226 may include the same material as that of the second source electrode 225, but embodiments of the present disclosure are not limited thereto. The second drain electrode 226 may be formed using the same process as that of the second source electrode 225, but embodiments of the present disclosure are not limited thereto. The second drain electrode 226 may be electrically connected to the second drain region of the second semiconductor layer 221. The second drain electrode 226 may be spaced apart from the second source electrode 225. For example, the fourth insulating layer 224 and the second protective layer 150 may include a second drain contact hole configured to partially expose the second drain region of the second semiconductor layer 221. The second drain electrode 226 may include a region overlapping with the second drain region of the second semiconductor layer 221. For example, the second drain electrode 226 may contact the second drain region of the second semiconductor layer 221 within the second drain contact hole.

The second thin film transistor 220 may further include an auxiliary layer 232 under the second semiconductor layer 221. The auxiliary layer 232 may overlap with the second semiconductor layer 221. For example, the auxiliary layer 232 may include a single layer or multiple layers including one of aluminum (Al), chromium (Cr), copper (Cu), titanium (Ti), molybdenum (Mo), nickel (Ni), neodymium (Nd), and tungsten (W) or an alloy thereof, but embodiments of the present disclosure are not limited thereto. The auxiliary layer 232 may block light directed to the second semiconductor layer 221 and, as such, may extend the lifespan of the second thin film transistor 220. For example, the auxiliary layer 232 may be a light shielding layer, without being limited thereto. For example, another auxiliary layer may be configured under the first thin film transistor 210. The other auxiliary layer may be disposed on a buffer layer 112. When the other auxiliary layer is configured, an insulating layer may be further configured on the buffer layer 112. The other auxiliary layer may be constituted by the same material as that of the auxiliary layer 232, but embodiments of the present disclosure are not limited thereto. The other auxiliary layer may block light directed to the first semiconductor layer 211 and, as such, may extend the lifespan of the first thin film transistor 210.

A buffer layer 110 may be disposed between the substrate 105 and the driving circuit of each pixel area PA. The buffer layer 110 may prevent contamination caused by the substrate 105 in a formation process for the driving circuits. For example, the buffer layer 110 may be disposed on the active area AA of the substrate 105. For example, the buffer layer 110 may cover the active area AA of the substrate 105. For example, the buffer layer 110 may completely cover the active area AA of the substrate 105. The buffer layer 110 may be disposed between the substrate 105 and the first semiconductor layer 211 of each pixel area PA. The buffer layer 110 may include an insulating material. For example, the buffer layer 110 may include an inorganic insulating material such as silicon oxide (SiOx) or silicon nitride (SiNx), but embodiments of the present disclosure are not limited thereto. The buffer layer 110 may have a multilayer structure, but embodiments of the present disclosure are not limited thereto. For example, the buffer layer 110 may include a structure including a first buffer layer 111 and a second buffer layer which is the buffer layer 112 and includes a material different from that of the first buffer layer 111, but embodiments of the present disclosure are not limited thereto.

The first protective layer 130 may prevent or at least reduce damage to the first thin film transistor 210 caused by external impact and moisture. The first protective layer 130 may extend between the auxiliary layer 232 of each pixel area PA and the second semiconductor layer 221. In the display apparatus according to the embodiment of the present disclosure, accordingly, damage to the first thin film transistors 210 caused by external impact and moisture may be effectively prevented or at least reduced.

In each pixel region PA, the second protective layer 150 may be disposed between the fourth insulating layer 224 and the second source electrode 225 and between the fourth insulating layer 224 and the second drain electrode 226. The second protective layer 150 may prevent or at least reduce damage to the second semiconductor layer 221 caused by external impact and moisture. For example, the second protective layer 150 may extend outwards beyond the second semiconductor layer 221 along the fourth insulating layer 224. The second protective layer 150 may include a material different from that of the fourth insulating layer 224. For example, the second protective layer 150 may include silicon nitride (SiNx), but embodiments of the present disclosure are not limited thereto. In the display apparatus according to the embodiment of the present disclosure, accordingly, damage to the second semiconductor layer 221 caused by external impact and moisture may be effectively prevented.

The first source electrode 215 of the first thin film transistor 210 may be disposed on the second protective layer 150 in each pixel area PA. The first source electrode 215 may include a conductive material. For example, the first source electrode 215 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The first source electrode 215 may include a material different from that of the first gate electrode 213, but embodiments of the present disclosure are not limited thereto. The first source electrode 215 may be electrically connected to the first source region of the first semiconductor layer 211. For example, the first insulating layer 212, the second insulating layer 214, the first protective layer 130, the fourth insulating layer 224, and the second protective layer 150 may include a first contact hole configured to partially expose the first source region of the first semiconductor layer 211. The first source electrode 215 may include a region overlapping with the first source region of the first semiconductor layer 211. For example, the first source electrode 215 may contact the first source region of the first semiconductor layer 211 within the first source contact hole.

The first drain electrode 216 of the first thin film transistor 210 may be disposed on the second protective layer 150 in each pixel area PA. The first drain electrode 216 may include a conductive material. For example, the first drain electrode 216 may include a single layer or multiple layers including one of aluminum (Al), chromium (Cr), copper (Cu), titanium (Ti), molybdenum (Mo), and tungsten (W) or an alloy thereof, but embodiments of the present disclosure are not limited thereto. The first drain electrode 216 may include a material different from that of the first gate electrode 213, but embodiments of the present disclosure are not limited thereto. For example, the first drain electrode 216 may include the same material as that of the first source electrode 215, but embodiments of the present disclosure are not limited thereto. The first drain electrode 216 may be formed using the same process as that of the first source electrode 215, but embodiments of the present disclosure are not limited thereto. The first drain electrode 216 may be electrically connected to the first drain region of the first semiconductor layer 211. The first drain electrode 216 may be spaced apart from the first source electrode 215. For example, the first insulating layer 212, the second insulating layer 214, the first protective layer 130, the fourth insulating layer 224, and the second protective layer 150 may include a first contact hole configured to partially expose the first drain region of the first semiconductor layer 211. The first drain electrode 216 may include a region overlapping with the first drain region of the first semiconductor layer 211. For example, the first drain electrode 216 may contact the first drain region of the first semiconductor layer 211 within the first contact hole.

The light emitting element 600 of each pixel area PA may be disposed on the transistor of the same pixel area PA. For example, the first thin film transistor 210 and the second thin film transistor 220 of each pixel area PA may be disposed between the substrate 105 and the first electrode 610 in the same pixel area PA. In the display apparatus according to the embodiment of the present disclosure, accordingly, the area occupied by each pixel area PA may be minimized. Accordingly, an enhancement in resolution may be achieved in the display apparatus according to the embodiment of the present disclosure.

A third protective layer 160 and a fourth protective layer 170 may be disposed between the driving circuit and the light emitting element 600 in each pixel area PA. For example, the first electrode 610, the emission layer 620, and the second electrode 630 in each pixel area PA may be disposed on the fourth protective layer 170 in the same pixel area PA. The third protective layer 160 and the fourth protective layer 170 may reduce or remove a step formed by transistors. For example, an upper surface of the fourth protective layer 170 facing the light emitting element 600 in each pixel area PA may be a flat surface. The third protective layer 160 and the fourth protective layer 170 may include an insulating material. For example, the third protective layer 160 and the fourth protective layer 170 may include an organic insulating material, but embodiments of the present disclosure are not limited thereto. The fourth protective layer 170 may include a material different from that of the third protective layer 160, but embodiments of the present disclosure are not limited thereto. In the display apparatus according to the embodiment of the present disclosure, accordingly, it may be possible to effectively reduce or remove a step formed by transistors.

An intermediate electrode 510 may be disposed between the third protective layer 160 and the fourth protective layer 170 in each pixel area PA. The light emitting element 600 may be electrically connected to the first drain electrode 216 of the first thin film transistor 210 through the intermediate electrode 510. For example, the intermediate electrode 510 may be connected to the first drain electrode 216 while extending through the third protective layer 160, and the first electrode 610 of the light emitting element 600 may be connected to the intermediate electrode 510 while extending through the fourth protective layer 170. The intermediate electrode 510 may include a region overlapping with the first drain electrode 216 and a region overlapping with the first electrode 610. For example, the intermediate electrode 510 may be disposed between the first drain electrode 216 and the first electrode 610. The intermediate electrode 510 may contact the first drain electrode 216. For example, the intermediate electrode 510 may directly contact the first drain electrode 216. The first electrode 610 may contact the intermediate electrode 510. For example, the first electrode 610 may directly contact the intermediate electrode 510. The intermediate electrode 510 may include a conductive material. For example, the intermediate electrode 510 may include a metal such as aluminum (Al), chromium (Cr), copper (Cu), titanium (Ti), molybdenum (Mo), or tungsten (W), but embodiments of the present disclosure are not limited thereto. The intermediate electrode 510 may include a material different from those of the first drain electrode 216 and the first electrode 610, but embodiments of the present disclosure are not limited thereto.

A bank 180 may be disposed on the fourth protective layer 170 in each pixel area PA. The bank 180 may include an insulating material. For example, the bank 180 may be constituted by a material including a black pigment, etc., or an organic material such as a benzocyclobutene resin, a polyimide resin, an acryl resin, a photosensitive polymer, or the like, but embodiments of the present disclosure are not limited thereto. When the bank 180 is constituted by a material including a black pigment or a black dye, the bank 180 may block light from an outside thereof and, as such, the display apparatus may achieve a greater enhancement in brightness. The bank 180 may include a material different from those of the third protective layer 160 and the fourth protective layer 170, but embodiments of the present disclosure are not limited thereto. The bank 180 may cover an edge of the first electrode 610. In each pixel area PA, the emission layer 620 and the second electrode 630 may be disposed on a portion of the first electrode 610 exposed by the bank 180. For example, the bank 180 may define an emission area within each pixel area PA.

A spacer 181 may be disposed on the bank 180 in each pixel area PA. The spacer 181 may be formed to have a smaller width than that of the bank 180. The spacer 181 may include an insulating material. For example, the spacer 181 may include an organic insulating material, but embodiments of the present disclosure are not limited thereto. The spacer 181 may be formed of the same material as that of the bank 180, but embodiments of the present disclosure are not limited thereto. The spacer 181 may prevent damage to the bank 180 and the emission material layer 622 formed on an adjacent pixel area PA due to a fine metal mask.

In each pixel area PA, the emission layer 620 may extend on and along the bank 180 and the spacer 181. Each pixel area PA may represent a color different from that of another pixel area PA adjacent thereto. For example, the emission material layer 622 of each pixel area PA may be separated from the emission material layer 622 of another pixel area PA adjacent to the former pixel area PA. The emission material layer 622 of each pixel area PA may include an end disposed within the same pixel area PA. The emission material layer 622 may be formed using a fine metal mask (FMM), but embodiments of the present disclosure are not limited thereto. The end of each emission material layer 622 may be disposed on the bank 180 and the spacer 181. The first common layer 621 and the second common layer 623 of each pixel area PA may extend along a surface of the bank 180. The first common layer 621 and the second common layer 623 of each pixel area PA may be connected to the first common layer 621 and the second common layer 623 of another pixel area PA adjacent to the former pixel area PA. In the display apparatus according to the embodiment of the present disclosure, accordingly, an enhancement in process efficiency may be achieved.

The voltage supplied to the second electrode 630 of each pixel area PA may be equal to the voltage supplied to the second electrode 630 of another pixel area PA adjacent to the former pixel area PA. For example, the second electrode 630 of each pixel area PA may be connected to the second electrode 630 of another pixel area PA adjacent to the bank 180. Accordingly, the display apparatus according to the embodiment of the present disclosure may control a brightness of each pixel area PA through a gate signal and a data signal applied to the same pixel area PA. The second electrode 630 of each pixel area PA may contact the second electrode 630 of another pixel area PA adjacent to the former pixel area PA.

An encapsulation member 700 may be disposed on the light emitting element 600 of each pixel area PA. The encapsulation member 700 may prevent or at least reduce damage to the light emitting elements 600 caused by external impact and moisture. The encapsulation member 700 may have a multilayer structure, but embodiments of the present disclosure are not limited thereto. For example, the encapsulation member 700 may include a first encapsulation layer 710, a second encapsulation layer 720, and a third encapsulation layer 730, but embodiments of the present disclosure are not limited thereto. Each of the first encapsulation layer 710, the second encapsulation layer 720, and the third encapsulation layer 730 may include an insulating material. The second encapsulation layer 720 may include a material different from that of the first encapsulation layer 710 and the third encapsulation layer 730, but embodiments of the present disclosure are not limited thereto. For example, the first encapsulation layer 710 and the third encapsulation layer 730 may include an inorganic insulating material, and the second encapsulation layer 720 may include an organic insulating material. In the display apparatus according to the embodiment of the present disclosure, accordingly, damage to the light emitting elements 600 caused by external impact and moisture may be effectively prevented or at least reduced. A step formed by the light emitting element 600 of each pixel area PA may be removed by the encapsulation member 700. For example, an upper surface of the encapsulation member 700 opposite to the substrate 105 may be a flat surface.

A touch part may be disposed on the encapsulation member 700. The touch part may sense touch of a user and/or a tool. For example, the touch part may include touch electrodes 811 and 822 and bridge electrodes 812. The touch electrodes 811 and 822 may be disposed in parallel. The bridge electrodes 812 may interconnect the touch electrodes 811. The touch electrodes 811 and 822 and the bridge electrodes 812 may include a conductive material. For example, the touch electrodes 811 and 822 and the bridge electrodes 812 may include a single layer or a double layer including one of aluminum (Al), chromium (Cr), copper (Cu), titanium (Ti), molybdenum (Mo), and tungsten (W) or an alloy thereof, but embodiments of the present disclosure are not limited thereto. The touch electrodes 811 and 822 and the bridge electrodes 812 may overlap with the active area AA of the substrate 105. In each pixel area PA, the light emitting element 600 may be disposed outside the touch electrodes 811 and 822 and the bridge electrodes 812. For example, the touch electrodes 811 and 822 and the bridge electrodes 812 may overlap with the bank 180. The touch electrodes 811 and 822 and the bridge electrodes 812 may be spaced apart from the light emitting element 600 in each pixel area PA. In the display apparatus according to the embodiment of the present disclosure, accordingly, light emitted in a direction perpendicular to an upper surface of the substrate 105 may not be blocked by the touch electrodes 811 and 822 and the bridge electrodes 812. In the display apparatus according to the embodiment of the present disclosure, accordingly, a reduction in brightness of each pixel area PA caused by the touch electrodes 811 and 822 and the bridge electrodes 812 may be prevented or at least reduced.

An insulating layer 830 may be disposed between each bridge electrode 812 and each of the touch electrodes 811 and 822. The insulating layer 830 may include an insulating material. For example, the insulating layer 830 may include a material such as silicon oxide (SiOx), silicon nitride (SiNx), or the like, but embodiments of the present disclosure are not limited thereto. The second touch electrodes 822 may be disposed on the same layer as that of the first touch electrodes 811, but embodiments of the present disclosure are not limited thereto. For example, the touch electrodes 811 and 822 may be disposed on the insulating layer 830 covering the bridge electrodes 812 interconnecting the touch electrodes 811 and 822. The insulating layer 830 may include touch contact holes configured to partially expose the bridge electrodes 812. Each touch electrode 811 may be connected to a corresponding one of the bridge electrodes 812 through a corresponding one of the touch contact holes.

A buffer layer 800 may be disposed between the encapsulation member 700 and the touch part 811-812-822. The buffer layer 800 may prevent or at least reduce damage to the encapsulation member 700 and the light emitting elements 600 caused by formation processes for the touch electrodes 811 and 822 and the bridge electrodes 812. The buffer layer 800 may include an insulating material. For example, the buffer layer 800 may include a material such as silicon oxide (SiOx), silicon nitride (SiNx) or the like, but embodiments of the present disclosure are not limited thereto.

An insulating layer 890 may be disposed on the touch part 811-812-822. The insulating layer 890 may prevent or at least reduce damage to the touch part 811-812-822 caused by external impact and moisture.

Figure 6:
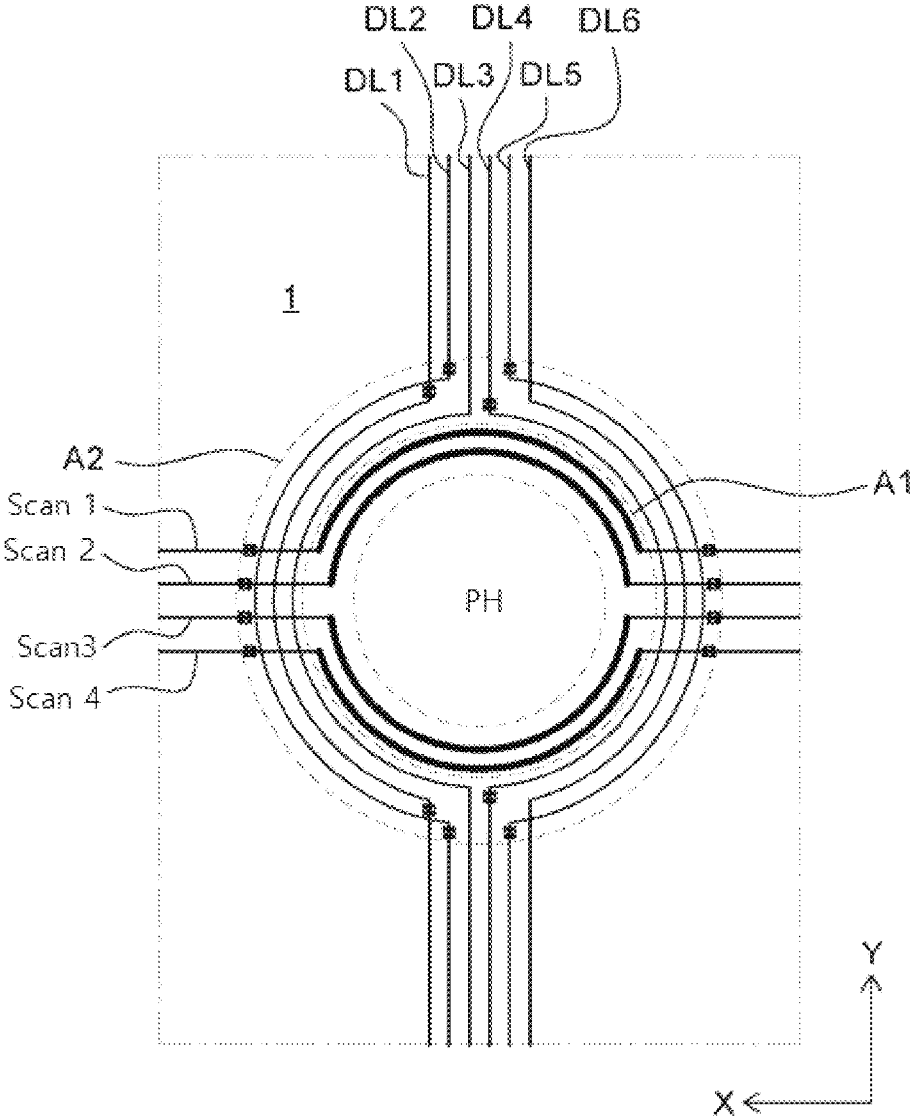
FIG. 6 is an enlarged view of scan lines and data lines in a first area of the display apparatus according to an embodiment of the present disclosure.
Figure 7:
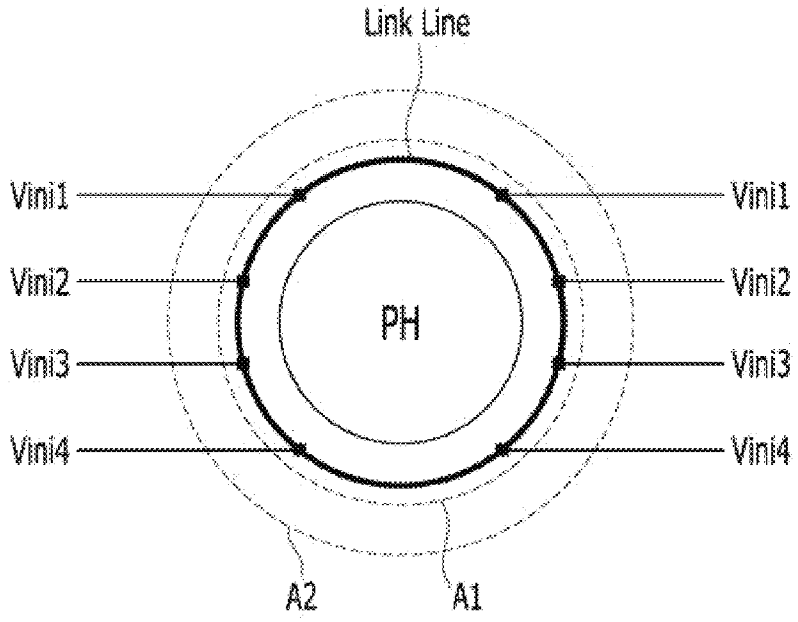
FIG. 7 is an enlarged view of initialization voltage supply lines respectively configured to supply initialization voltages in the first area of the display apparatus according to an embodiment of the present disclosure.

FIG. 6 is an enlarged view of scan lines and data lines in the first area of the display apparatus according to the embodiment of the present disclosure. FIG. 7 is an enlarged view of initialization voltage supply lines respectively configured to supply initialization voltages in the first area of the display apparatus according to the embodiment of the present disclosure.

As shown in FIG. 6, the first area 1 of the display apparatus according to the embodiment of the present disclosure may include an area in which the hole PH is disposed, a third area A1 surrounding the hole PH, and a fourth area A2 surrounding the third area A1. For example, the third area A1 may be an area contacting an outer circumference of the hole PH. The fourth area A2 may be an area contacting an outer circumference of the third area A1. For example, the first area 1 may include the third area A1 and the fourth area A2. For example, the first area 1 may include the third area A1 and the fourth area A2 which form circles about the hole PH, respectively. For example, the first area 1 may include the third area A1 and the fourth area A2 which are disposed around the hole PH. A camera or a sensor may be disposed at the hole PH, but embodiments of the present disclosure are not limited thereto. The sensor may include at least one of a proximity sensor, a gesture sensor, a color sensor, a biosensor, or an infrared sensor, but embodiments of the present disclosure are not limited thereto.

A plurality of scan lines Scan 1, Scan 2, Scan 3, and Scan 4 may bypass the hole PH in the third area A1. For example, the plurality of scan lines Scan 1, Scan 2, Scan 3, and Scan 4 disposed in the third area A1 may have a semicircular shape, but embodiments of the present disclosure are not limited thereto. The plurality of scan lines Scan 1, Scan 2, Scan 3, and Scan 4 disposed in the third area A1 may be diversely varied to have shapes according to the outer circumference of the hole PH.

The plurality of scan lines Scan 1, Scan 2, Scan 3, and Scan 4 may extend in an X-axis direction in the first area 1 and the fourth area A2. For example, the plurality of scan lines Scan 1, Scan 2, Scan 3, and Scan 4 disposed in the first area 1 and the fourth area A2 may take the form of a straight line extending in the X-axis direction, but embodiments of the present disclosure are not limited thereto. In addition, the plurality of scan lines Scan 1, Scan 2, Scan 3, and Scan 4 disposed in the first area 1 and the fourth area A2 may be formed at the same layer as that of the gate electrode 151 of the thin film transistor using the same material as that of the gate electrode 151, but embodiments of the present disclosure are not limited thereto.

In addition, the plurality of scan lines Scan 1, Scan 2, Scan 3, and Scan 4 disposed in the third area A1 may have a semicircular shape to bypass the hole PH which may be a through hole, but embodiments of the present disclosure are not limited thereto. The plurality of scan lines Scan 1, Scan 2, Scan 3, and Scan 4 disposed in the third area A1 may be formed at the same layer as that of the first shielding layer 130 of the thin film transistor using the same material as that of the first shielding layer 130, but embodiments of the present disclosure are not limited thereto.

For example, each of the plurality of scan lines Scan 1, Scan 2, Scan 3, and Scan 4 may be formed at the same layer as that of the gate electrode 151 of the thin film transistor in the active area AA using the same material as that of the gate electrode 151, but embodiments of the present disclosure are not limited thereto. The plurality of scan lines Scan 1, Scan 2, Scan 3, and Scan 4 may be formed at different layers, respectively, in the first area 1 and the third area A1 and, as such, corresponding ones of the plurality of scan lines Scan 1, Scan 2, Scan 3, and Scan 4 disposed in the first area 1 and the plurality of scan lines Scan 1, Scan 2, Scan 3, and Scan 4 disposed in the third area A1 may be electrically interconnected through contact holes formed at the first insulating layer 141, respectively.

A plurality of data lines DL1 to DL6 may bypass the hole PH in the fourth area A2. For example, the plurality of data lines DL1 to DL6 disposed in the fourth area A2 may have a semicircular shape, but embodiments of the present disclosure are not limited thereto. The plurality of data lines DL1 to DL6 disposed in the fourth area A2 may be diversely varied to have shapes according to an outer circumference of the third area A1.

Each of the first to sixth data lines DL1 to DL6 may extend in a Y-axis direction in the first area 1. For example, each of the first to sixth data lines DL1 to DL6 disposed in the first area 1 may take the form of a straight line extending in the Y-axis direction, but embodiments of the present disclosure are not limited thereto. In addition, the first to sixth data lines DL1 to DL6 disposed in the first area 1 may be formed at the same layer as that of the source electrode 153 and the drain electrode 154 of the thin film transistor using the same material as that of the source electrode 153 and the drain electrode 154. Of course, embodiments of the present disclosure are not limited to the above-described conditions.

The first to sixth data lines DL1 to DL6 disposed in the fourth area A2 may have a semicircular shape to bypass the hole PH, but embodiments of the present disclosure are not limited thereto. The first to sixth data lines DL1 to DL6 may be formed at the same layer as that of the source electrode 153 and the drain electrode 154 of the thin film transistor using the same material as that of the source electrode 153 and the drain electrode 154. Of course, embodiments of the present disclosure are not limited to the above-described conditions. In another example, the first to sixth data lines DL1 to DL6 may be formed at the same layer as that of the gate electrode 151 of the thin film transistor using the same material as that of the gate electrode 151. In another embodiment, the first to sixth data lines DL1 to DL6 may be formed at the same layer as that of the connection electrode 155 using the same material as that of the connection electrode 155.

For example, each of the first data line DL1 and the fourth data line DL4 may be formed in the first area 1 at the same layer as that of the source electrode 153 and the drain electrode 154 of the thin film transistor using the same material as that of the source electrode 153 and the drain electrode 154, and may be formed in the fourth area A2 at the same layer as that of the connection electrode 155 using the same material as that of the connection electrode 155. Of course, embodiments of the present disclosure are not limited to the above-described conditions. For example, each of the first data line DL1 and the fourth data line DL4 may be formed in the first area 1 and the fourth area A2 at different layers, respectively. As such, the first data line DL1 disposed in the first area 1 and the first data line DL1 disposed in the fourth area A2 may be electrically interconnected through a contact hole formed at the third insulating layer 143. In addition, the fourth data line DL4 disposed in the first area 1 and the fourth data line DL4 disposed in the fourth area A2 may be electrically interconnected through a contact hole formed at the third insulating layer 143.

In addition, each of the second data line DL2 and the fifth data line DL5 may be formed in the first area 1 at the same layer as that of the source electrode 153 and the drain electrode 154 of the thin film transistor using the same material as that of the source electrode 153 and the drain electrode 154, and may be formed in the fourth area A2 at the same layer as that of the connection electrode 155 using the same material as that of the connection electrode 155. Of course, embodiments of the present disclosure are not limited to the above-described conditions. For example, each of the second data line DL2 and the fifth data line DL5 may be formed in the first area 1 and the fourth area A2 at different layers, respectively. As such, the second data line DL2 disposed in the first area 1 and the second data line DL2 disposed in the fourth area A2 may be electrically interconnected through a contact hole formed at the first protective layer 130. In addition, the fifth data line DL5 disposed in the first area 1 and the fifth data line DL5 disposed in the fourth area A2 may be electrically interconnected through a contact hole formed at the first protective layer 130.

In addition, each of the third data line DL3 and the sixth data line DL6 may be formed in the first area 1 at the same layer as that of the source electrode 153 and the drain electrode 154 of the thin film transistor using the same material as that of the source electrode 153 and the drain electrode 154, and may be formed in the fourth area A2 at the same layer as that of the source electrode 153 and the drain electrode 154 of the thin film transistor using the same material as that of the source electrode 153 and the drain electrode 154. Of course, embodiments of the present disclosure are not limited to the above-described conditions. As such, corresponding ones of the third data line DL3 and the sixth data line DL6 in the first area 1 and the third data line DL3 and the sixth data line DL6 in the fourth area A2 may be electrically interconnected without separate contact holes, respectively.

Although FIG. 6 shows that the plurality of scan lines Scan 1, Scan 2, Scan 3, and Scan 4 are disposed in the third area A1, and the plurality of data lines DL1 to DL6 are disposed in the fourth area A2, embodiments of the present disclosure are not limited thereto. For example, the plurality of data lines DL1 to DL6 may be disposed in the third area A1, and the plurality of scan lines Scan 1, Scan 2, Scan 3, and Scan 4 may be disposed in the fourth area A2.

The initialization voltage supply lines configured to supply initialization voltages in the first area of the display apparatus according to the embodiment of the present disclosure may be configured as follows.

As shown in FIG. 7, the first area 1 of the display apparatus according to the embodiment of the present disclosure may include an area in which the hole PH is disposed, a third area A1 surrounding the hole PH, and a fourth area A2 surrounding the third area A1. For example, the third area A1 may be an area contacting an outer circumference of the hole PH. The fourth area A2 may be an area contacting an outer circumference of the third area A1. A camera or a sensor may be disposed at the hole PH. The sensor may be an infrared sensor or an ultraviolet sensor, but embodiments of the present disclosure are not limited thereto.

In the third area A1, an initialization voltage supply link line Link Line configured to supply an initialization voltage Vini may bypass the hole PH. For example, the initialization voltage supply link line Link Line disposed in the third area A1 may have a circular shape, but embodiments of the present disclosure are not limited thereto. For example, the initialization voltage supply link line Link Line may be disposed to have a shape corresponding to the shape of the hole PH. The initialization voltage supply link line Link Line disposed in the third area A1 may be diversely varied to have a shape according to the outer circumference of the hole PH.

The initialization voltage supply link line Link Line may be formed at the same layer as that of the source electrode 153 and the drain electrode 154 of the thin film transistor using the same material as that of the source electrode 153 and the drain electrode 154, but embodiments of the present disclosure are not limited thereto. In another example, the initialization voltage supply link line Link Line may be formed at the same layer as that of the gate electrode 151 of the thin film transistor using the same material as that of the gate electrode 151. In another example, the initialization voltage supply link line Link Line may be formed at the same layer as that of the first shielding layer 130 of the thin film transistor using the same material as that of the first shielding layer 130.

A plurality of initialization voltage supply lines Vini1, Vini2, Vini3, and Vini4 may extend in the X-axis direction in the first area 1 and the fourth area A2. For example, the plurality of initialization voltage supply lines Vini1, Vini2, Vini3, and Vini4 disposed in the first area 1 and the fourth area A2 may each take the form of a straight line extending in the X-axis direction, but embodiments of the present disclosure are not limited thereto. In addition, the plurality of initialization voltage supply lines Vini1, Vini2, Vini3, and Vini4 disposed in the first area 1 and the fourth area A2 may be formed at the same layer as that of the source electrode 153 and the drain electrode 154 of the thin film transistor using the same material as that of the source electrode 153 and the drain electrode 154, but embodiments of the present disclosure are not limited thereto. In another example, the plurality of initialization voltage supply lines Vini1, Vini2, Vini3, and Vini4 may be formed at the same layer as that of the gate electrode 151 of the thin film transistor using the same material as that of the gate electrode 151. In another example, the plurality of initialization voltage supply lines Vini1, Vini2, Vini3, and Vini4 may be formed at the same layer as that of the connection electrode 155 using the same material as that of the connection electrode 155. In another example, the plurality of initialization voltage supply lines Vini1, Vini2, Vini3, and Vini4 may be formed at the same layer as that of the first shielding layer 130 of the thin film transistor using the same material as that of the first shielding layer 130. Of course, embodiments of the present disclosure are not limited to the above-described conditions.

The plurality of initialization voltage supply lines Vini1, Vini2, Vini3, and Vini4 disposed at a left side of the hole PH and the plurality of initialization voltage supply lines Vini1, Vini2, Vini3, and Vini4 disposed at a right side of the hole PH may be electrically interconnected through the initialization voltage supply link line Link Line.

The initialization voltage supply link line Link Line and the plurality of initialization voltage supply lines Vini1, Vini2, Vini3, and Vini4 may be formed at the same layer using the same material or may be formed at different layers using different materials. Of course, embodiments of the present disclosure are not limited to the above-described conditions.

Connection relations between the initialization voltage supply link line Link Line and the plurality of initialization voltage supply lines Vini1, Vini2, Vini3, and Vini4 may be achieved in accordance with substantially the same method as the method described in conjunction with the plurality of scan lines and the plurality of data lines described with reference to FIG. 6.

Figure 8:
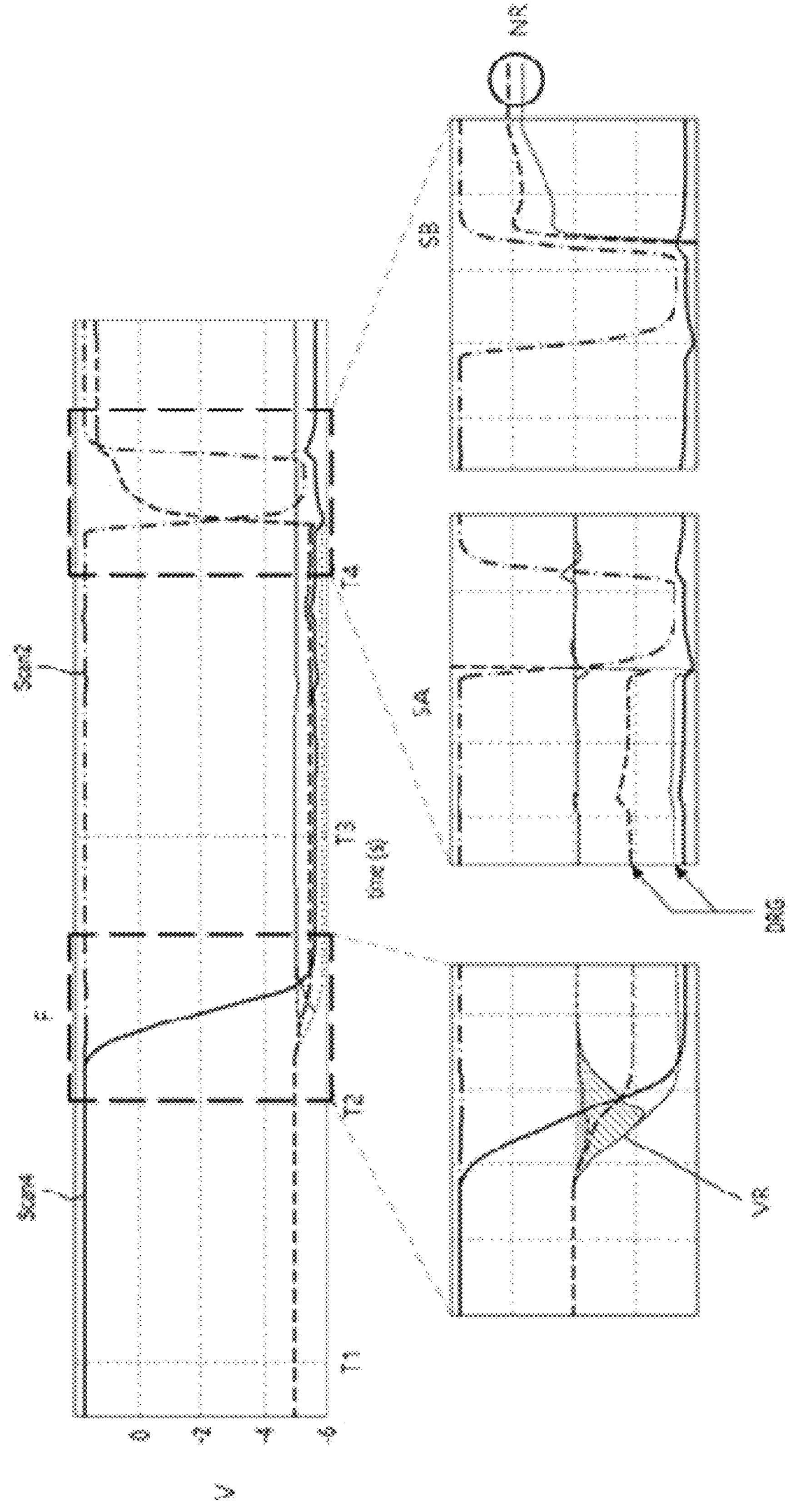
FIG. 8 is a waveform diagram depicting initialization voltages in the first area and a second area in the display apparatus according to an embodiment of the present disclosure.

FIG. 8 is a waveform diagram depicting the fourth scan signal Scan4 and the second scan signal Scan2, and initialization voltages Vini in the first area 1 and the second area 2 before and after an initialization period T1 and a sampling period Ts1-Ts2. In FIG. 8, the initialization voltage Vini supplied to the first area 1 is indicated by a dotted line, and the initialization voltage Vini supplied to the second area 2 is indicated by a solid line. In FIG. 8, the horizontal axis indicates time (seconds), and the vertical axis indicates voltage (V).

As shown in FIG. 4, respective numbers of pixels disposed in the first area 1 and the second area 2 may be different from each other. For example, no pixel is disposed at the hole PH of the first area 1 and, as such, the number of pixels disposed in a horizontal direction may be smaller in the first area 1 than in the second area 2.

Referring to FIG. 7, in the first area 1, the initialization voltage supply link line Link Line may be disposed to bypass the hole PH and the plurality of initialization voltage supply lines Vini1, Vini2, Vini3, and Vini4 may be disposed to be electrically interconnected through the initialization voltage supply link line Link Line. The initialization voltage supply link line Link Line may not be disposed in the second area 2.

Accordingly, the initialization voltage supply lines respectively disposed in the first area 1 and the second area 2 exhibit a load (resistance) difference therebetween. For example, the initialization voltage supply line disposed in the first area 1 may have a lower load (or a lower line resistance) than the initialization voltage supply line disposed in the second area 2.

As a result, as shown in FIG. 8, the initialization voltage Vini may exhibit a ripple difference between the first area 1 and the second area 2 at a falling time F of the fourth scan signal Scan4. For example, the ripple of the initialization voltage Vini supplied to the second node N2 of each pixel disposed in the first area 1 may be smaller than the ripple of the initialization voltage Vini supplied to the second node N2 of each pixel disposed in the second area 2.

In addition, due to the ripple difference of the initialization voltage Vini between the first area 1 and the second area 2, the second node N2 (FIG. 2) exhibits a voltage difference between the first area 1 and the second area 2 even before the sampling period Ts1-Ts2 (SA) and after the sampling period Ts1-Ts2 (SB). For example, the initialization voltage Vini supplied to the second node N2 of each pixel disposed in the first area 1 may be higher than the initialization voltage Vini supplied to the second node N2 of each pixel disposed in the second area 2 (DRG and NR). As a result, brightness deviation may be generated between the first area 1 and the second area 2.

As described with reference to FIG. 2, a parasitic capacitor Cp may be formed between the first scan line Scan 1 configured to supply the first scan signal Scan1 to the first transistor T1 and the second node N2 configured to supply the initialization voltage Vini due to overlap between the first scan line Scan 1 and the second node N2. In addition, the capacitance of the parasitic capacitor Cp of each pixel disposed in the first area 1 and the capacitance of the parasitic capacitor Cp of each pixel disposed in the second area 2 may be set to be different from each other. Accordingly, it may be possible to reduce or prevent brightness deviation between the first area 1 and the second area 2.

For example, the capacitance of the parasitic capacitor Cp of each pixel disposed in the first area 1 may be set to be greater than the capacitance of the parasitic capacitor Cp of each pixel disposed in the second area 2.

In accordance with the present disclosure, the initialization voltage Vini supplied to the second node N2 of each pixel disposed in the first area 1 may be higher than the initialization voltage Vini supplied to the second node N2 of each pixel disposed in the second area 2 and, as such, the capacitance of the parasitic capacitor Cp of each pixel disposed in the first area 1 may be set to be greater than the capacitance of the parasitic capacitor Cp of each pixel disposed in the second area 2. Accordingly, a voltage difference between the second node N2 disposed in the first area 1 and the second node N2 of each pixel disposed in the second area 2 may be offset in accordance with coupling of the parasitic capacitors Cp of each pixel.

As described with reference to FIGS. 2, 3, and 8, the second node N2 may be initialized to the initialization voltage Vini by the fourth scan signal Scan4. Since an initialization voltage Vini_a initializing the second node N2 of each pixel disposed in the first area 1 is higher than an initialization voltage Vini_b initializing the second node N2 of each pixel disposed in the second area 2, a sampling voltage sampled at the second node N2 of each pixel disposed in the first area 1 (Vdata+Vth+vini_a) is also higher than a sampling voltage sampled at the second node N2 of each pixel disposed in the second area 2 (Vdata+Vth+vini_b) even after the sampling period Ts1-Ts2 (NR).

In addition, after the sampling period Ts1-Ts2, coupling of the parasitic capacitor Cp may be generated at a falling time of the first scan signal Scan1. The sampling voltage sampled at the second node N2 of each pixel disposed in the first area 1 (Vdata+Vth+vini_a) may be lowered more than the sampling voltage sampled at the second node N2 of each pixel disposed in the second area 2 (Vdata+Vth+vini_b) in proportion to the capacitance of the parasitic capacitor Cp.

Accordingly, it may be possible to offset the voltage difference between the second node N2 of each pixel disposed in the first area 1 and the second node N2 of each pixel disposed in the second area 2 by virtue of coupling of the parasitic capacitor Cp of each pixel.

In addition, since the voltage difference between the second node N2 of each pixel disposed in the first area 1 and the second node N2 of each pixel disposed in the second area 2 may be offset, it may be possible to prevent generation of brightness deviation between the first area 1 and the second area 2.

Figure 9A:
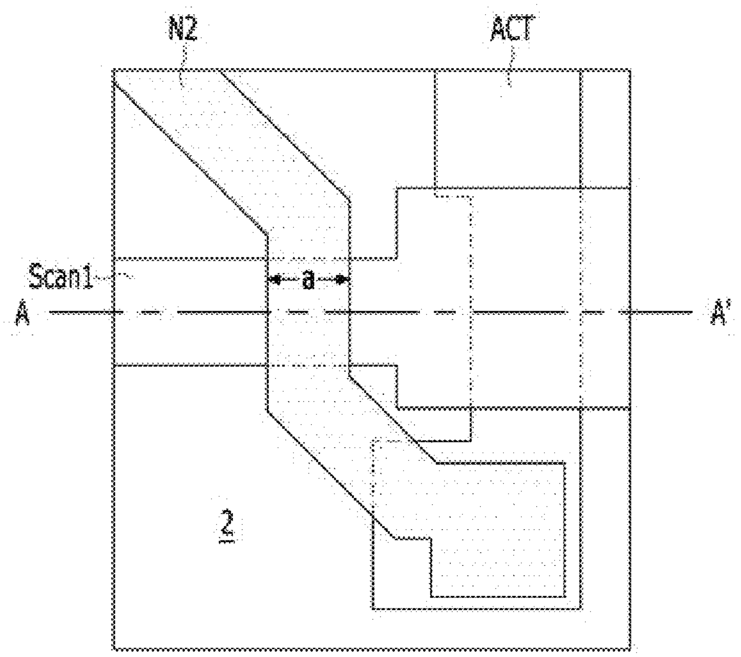
FIGS. 9A to 9C are illustrative plan views showing a first transistor, a second node, and a parasitic capacitor in the pixel circuit of FIG. 2 according to an embodiment of the present disclosure.
Figure 9B:
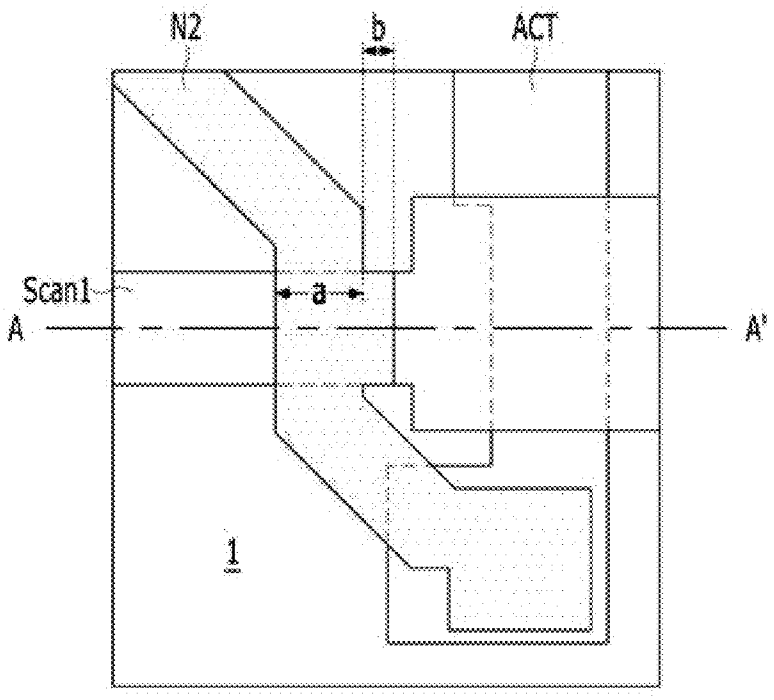
Figure 9C:
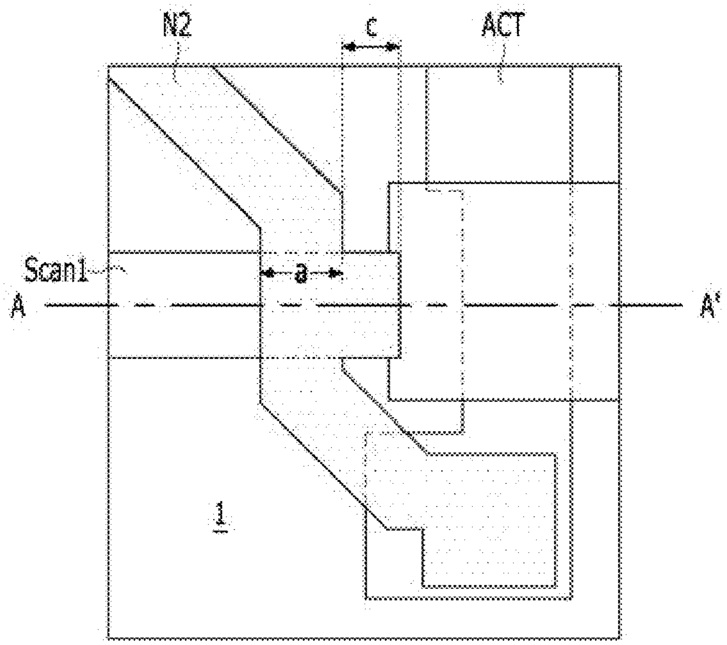

FIGS. 9A to 9C are illustrative plan views showing the first transistor T1, the second node N2, and the parasitic capacitor Cp in the pixel circuit of FIG. 2 according to an embodiment of the present disclosure. FIG. 9A is an illustrative plan view showing the first transistor T1, the second node N2, and the parasitic capacitor Cp of each pixel disposed in the second area. FIG. 9B is an illustrative plan view showing the first transistor T1, the second node N2, and the parasitic capacitor Cp of each pixel disposed in the first area at a left side of the hole. FIG. 9C is an illustrative plan view showing the first transistor T1, the second node N2, and the parasitic capacitor Cp of each pixel disposed in the first area at a right side of the hole.

Figure 10A:
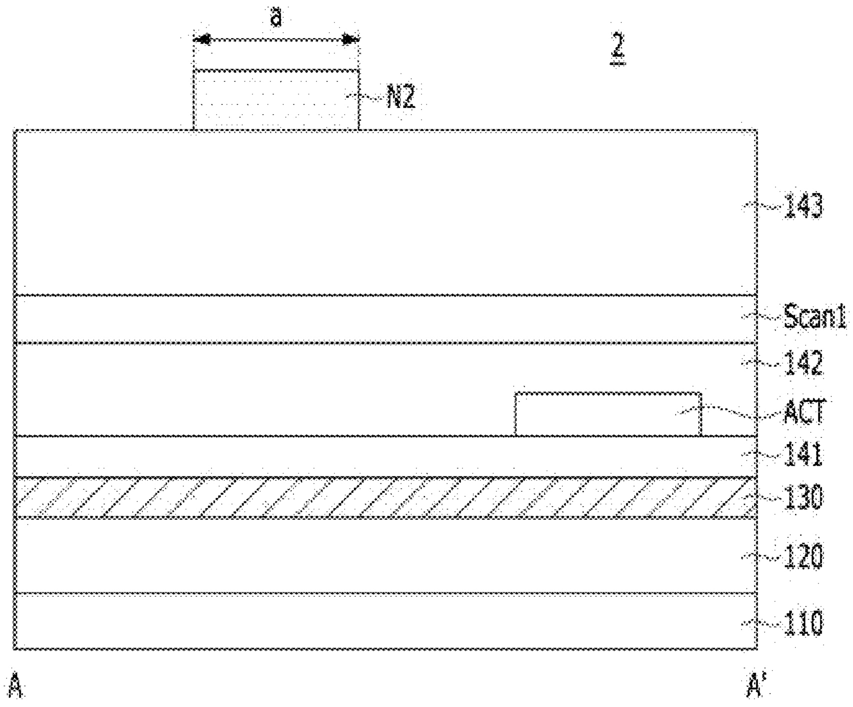
FIGS. 10A to 10C are illustrative cross-sectional views taken along line A-A' in FIGS. 9A to 9C, respectively, according to an embodiment of the present disclosure.
Figure 10B:
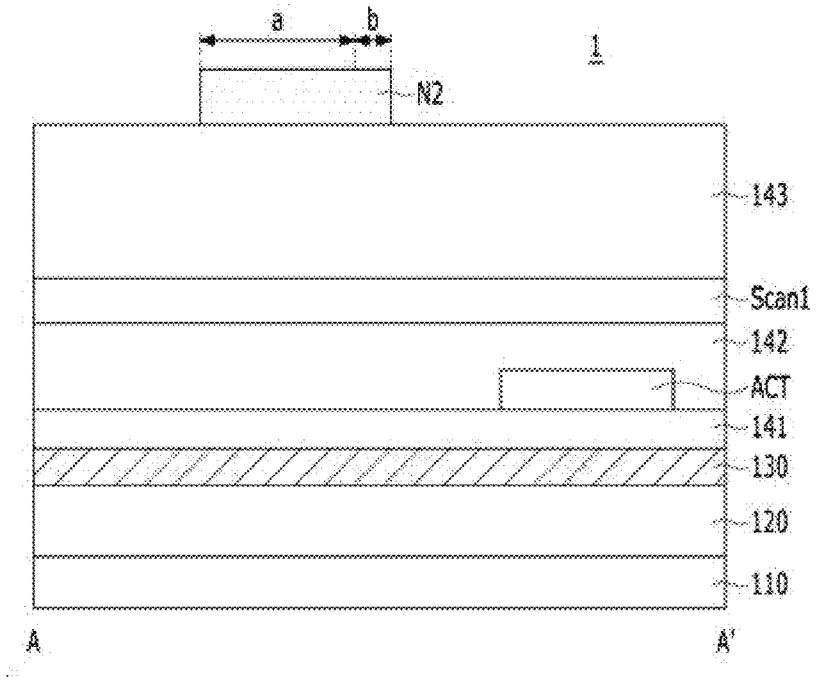
Figure 10C:
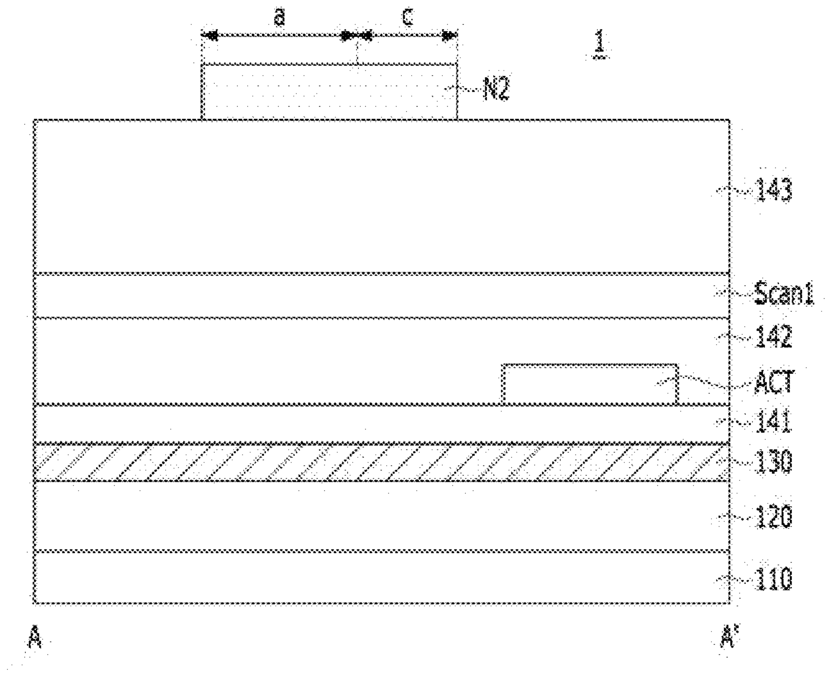

FIGS. 10A to 10C are illustrative cross-sectional views taken along line A-A' in FIGS. 9A to 9C, respectively, according to one embodiment. FIG. 10A is an illustrative cross-sectional view showing the first transistor T1, the second node N2, and the parasitic capacitor Cp of each pixel disposed in the second area. FIG. 10B is an illustrative cross-sectional view showing the first transistor T1, the second node N2, and the parasitic capacitor Cp of each pixel disposed in the first area at the left side of the hole. FIG. 10C is an illustrative cross-sectional view showing the first transistor T1, the second node N2, and the parasitic capacitor Cp of each pixel disposed in the first area at the right side of the hole.

In FIG. 2, the second node N2 is connected to the initialization voltage supply line configured to supply the initialization voltage Vini through the fifth transistor T5 while being connected to the gate electrode of the driving transistor D-TFT and the first electrode of the first transistor T1.

Accordingly, as shown in FIGS. 9A to 9C and FIGS. 10A to 10C, the first scan signal line Scan1 configured to supply the first scan signal to the gate electrode of the first transistor T1 may overlap with the second node N2. As the first scan signal line Scan1 and the second node N2 overlap each other, the parasitic capacitor Cp may be configured.

FIGS. 9A to 9C and FIGS. 10A to 10C are views briefly showing a semiconductor layer (active layer) ACT of the first transistor T1, the first scan line Scan1, and the second node N2 in FIG. 2.

The buffer layer 120, the first shielding layer 130, and the first insulating layer 141 may be disposed on the substrate 110.

The active layer ACT of the first transistor may be disposed on the first insulating layer 141. The second insulating layer 142 may be disposed on the active layer ACT. The gate electrode or the first scan line Scan1 may be disposed on the second insulating layer 142. The gate electrode or the first scan line Scan1 may overlap with the active layer ACT. The third insulating layer 143 may be disposed on the gate electrode or the first scan line Scan1 and the second insulating layer 142. The second node N2 may be disposed on the third insulating layer 143. The second node N2 may overlap with the first scan line Scan1.

The active layer ACT may be constituted by polycrystalline silicon or low-temperature polycrystalline silicon. In this case, a portion of the active layer ACT may be doped with an impurity. In addition, the active layer ACT may be constituted by amorphous silicon, an organic semiconductor material, or an oxide.

As described with reference to FIGS. 9A to 9C and FIGS. 10A to 10C, the second node N2 overlapping with the first scan signal line Scan1 may be formed to have a greater width in each pixel of the first area than in each pixel of the second area.

As shown in FIGS. 9A to 9C and FIGS. 10A to 10C, the area in which the first scan signal line Scan1 and the second node N2 of each pixel disposed in the first area overlap each other (cf. FIGS. 9B and 9C and FIGS. 10B and 10C) may be configured to be greater than the area in which the first scan signal line Scan1 and the second node N2 of each pixel disposed in the second area overlap each other (cf. FIGS. 9A and 10A).

For example, as shown in FIGS. 9A and 10A, the second node N2 overlapping with the first scan signal line Scan1 in each pixel disposed in the second area may have a width "a". On the other hand, as shown in FIGS. 9B and 9C and FIGS. 10B and 10C, the second node N2 overlapping with the first scan signal line Scan1 in each pixel disposed in the first area may have a width "a+b" or "a+c". As such, the width of the second node N2 overlapping with the first scan signal line Scan1 in each pixel disposed in the first area may be greater than the width of the second node N2 overlapping with the first scan signal line Scan1 in each pixel disposed in the second area.

In addition, the area in which the first scan signal line Scan1 and the second node N2 of each pixel disposed in the first area at the right side of the hole overlap each other may be configured to be greater than the area in which the first scan signal line Scan1 and the second node N2 of each pixel disposed in the first area at the left side of the hole overlap each other. For example, as shown in FIGS. 9B and 10B, the second node N2 overlapping with the first scan signal line Scan1 in each pixel disposed in the first area at the left side of the hole may have a width "a+b". On the other hand, as shown in FIGS. 9C and 10C, the second node N2 overlapping with the first scan signal line Scan1 in each pixel disposed in the first area at the right side of the hole may have a width "a+c". Here, "c" is greater than "b". As such, the width of the second node N2 overlapping with the first scan signal line Scan1 in each pixel disposed in the first area at the right side of the hole may be greater than the width of the second node N2 overlapping with the first scan signal line Scan1 in each pixel disposed in the first area at the left side of the hole.

Accordingly, the capacitance of the parasitic capacitor Cp in each pixel disposed in the first area may be greater than the capacitance of the parasitic capacitor Cp in each pixel disposed in the second area. In addition, the capacitance of the parasitic capacitor Cp in each pixel disposed in the first area at the right side of the hole may be greater than the capacitance of the parasitic capacitor Cp in each pixel disposed in the first area at the left side of the hole.

Figure 11:
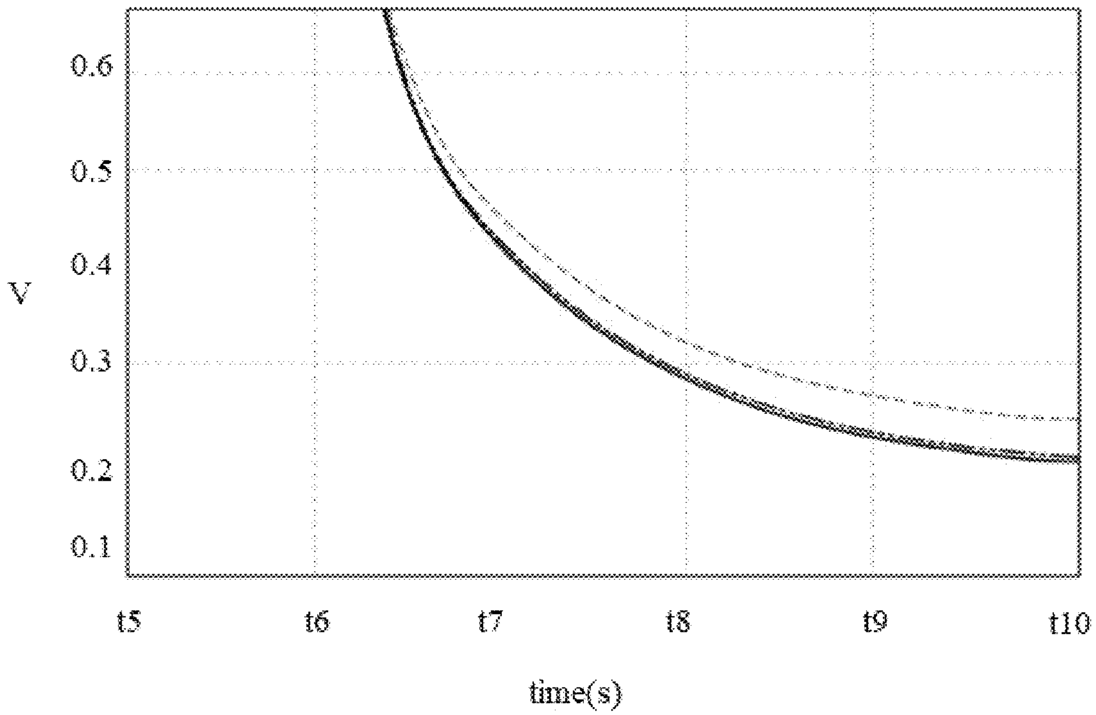
FIG. 11 is a comparison graph of initialization voltages in the first and second areas and a compensated initialization voltage in the first area.

FIG. 11 is a comparison graph of initialization voltages Vini in the first and second areas and a compensated initialization voltage Vini in the first area.

When coupling of the parasitic capacitor Cp is generated at a falling time of the first scan signal Scan1, a sampling voltage may be further lowered (dropped) in proportion to the capacitance of the parasitic capacitor Cp. For example, the capacitance of the parasitic capacitor Cp in each pixel disposed in the first area is greater than the capacitance of the parasitic capacitor Cp in each pixel disposed in the second area and, as such, the sampling voltage sampled at the second node N2 of each pixel disposed in the first area (Vdata+Vth+vini_a) may be lowered (dropped) more than the sampling voltage sampled at the second node N2 of each pixel disposed in the second area (Vdata+Vth+vini_b).

Accordingly, as shown in FIG. 11, it may be possible to offset the voltage difference between the second node N2 of each pixel disposed in the first area and the second node N2 of each pixel disposed in the second area by virtue of coupling of the parasitic capacitor Cp of each pixel.

In FIG. 11, the initialization voltage Vini of the first area is indicated by a dotted line, the initialization voltage Vini of the second area 2 is indicated by a solid line, and the compensated initialization voltage Vini of the first area is indicated by a dash-double dotted line. In FIG. 11, the horizontal axis indicates time (seconds), and the vertical axis indicates voltage (V).

In addition, since the voltage difference between the second node N2 of each pixel disposed in the first area and the second node N2 of each pixel disposed in the second area may be offset, it may be possible to prevent generation of brightness deviation between the first area and the second area.

In addition, the initialization voltage Vini supplied to the second node N2 of each pixel disposed in the first area at the right side of the hole may be higher than the initialization voltage Vini supplied to the second node N2 of each pixel disposed in the first area at the left side of the hole. As a result, brightness deviation may be generated between the left side and the right side of the first area.

As described with reference to FIGS. 9B and 9C and FIGS. 10B and 10C, the capacitance of the parasitic capacitor Cp in each pixel disposed in the first area at the right side of the hole may be configured to be greater than the capacitance of the parasitic capacitor Cp in each pixel disposed in the first area at the left side of the hole. Accordingly, when coupling of the parasitic capacitor Cp is generated at a falling time of the first scan signal Scan1, a sampling voltage sampled at the second node N2 of each pixel disposed in the first area at the right side of the hole may be lowered (dropped) more than the sampling voltage sampled at the second node N2 of each pixel disposed in the first area at the left side of the hole, in proportion to the capacitances of the parasitic capacitors Cp.

Accordingly, it may be possible to offset the voltage difference between the second node N2 of each pixel disposed in the first area at the right side of the hole and the second node N2 of each pixel disposed in the first area at the left side of the hole by virtue of coupling of the parasitic capacitor Cp of each pixel.

Since, even in the first area, the voltage difference between respective second nodes N2 of the pixels at the left and right sides of the hole are offset, a further enhancement in image quality may be achieved.

In addition, since it may be possible to prevent brightness deviation between the first area and the second area and brightness deviation of the first area between the left and right sides of the hole, a defect rate of the display apparatus may be reduced. Accordingly, production energy for production of the display apparatus may be reduced, and greenhouse gases possibly generated due to a manufacturing process may be reduced. As such, environment/social/governance (ESG) goals may be achieved.

A display apparatus according to various embodiments of the present disclosure may be applied to a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic diary, an electronic book, a portable multimedia player (PMP), a personal digital assistant (PDA), an MP3 player, a mobile medical appliance, a desktop computer, a laptop computer, a netbook computer, a workstation, a navigator, a vehicle navigator, a vehicle display apparatus, vehicle equipment, theater equipment, a theater display apparatus, a television, a wall paper appliance, a signage device, a gaming device, a notebook computer, a monitor, a camera, a camcorder, a home appliance, etc.

Display apparatuses according to various embodiments of the present disclosure may be explained as follows.

A display apparatus according to various embodiments of the present disclosure may include a first area including a hole, a second area disposed around the hole, and a pixel disposed in each of the first area and the second area. The pixel may include an initialization voltage line, a first scan signal line, and a capacitor disposed between the initialization voltage line and the first scan signal line. The capacitor in the first area may have a capacitance different from a capacitance of the capacitor in the second area.

In accordance with various embodiments of the present disclosure, the capacitance of the capacitor in the first area may be greater than the capacitance of the capacitor in the second area.

In accordance with various embodiments of the present disclosure, an area of the first scan signal line overlapping with a second node may be greater in the first area than in the second area.

In accordance with various embodiments of the present disclosure, the first area may include a third area and a fourth area disposed around the hole. The capacitor in the fourth area may have a capacitance different from a capacitance of the capacitor in the third area.

In accordance with various embodiments of the present disclosure, the capacitance of the capacitor in the fourth area may be greater than the capacitance of the capacitor in the third area.

In accordance with various embodiments of the present disclosure, an area of the first scan signal line overlapping with the second node may be greater in the fourth area than in the third area.

A display apparatus according to various embodiments of the present disclosure may include a first area including a hole, a second area disposed around the hole, and a pixel disposed in each of the first area and the second area. The pixel may include a first scan signal line, a driving transistor including a first node, a second node, and a third node, and a capacitor disposed between the second node and the first scan signal line. The capacitor in the first area may have a capacitance different from a capacitance of the capacitor in the second area.

In accordance with various embodiments of the present disclosure, the capacitance of the capacitor in the first area may be greater than the capacitance of the capacitor in the second area.

In accordance with various embodiments of the present disclosure, an area of the first scan signal line overlapping with the second node is greater in the first area than in the second area.

In accordance with various embodiments of the present disclosure, the first area may include a third area and a fourth area disposed around the hole. The capacitor in the third area may have a capacitance different from a capacitance of the capacitor in the fourth area.

In accordance with various embodiments of the present disclosure, the capacitance of the capacitor in the fourth area may be greater than the capacitance of the capacitor in the third area.

In accordance with various embodiments of the present disclosure, an area of the first scan signal line overlapping with the second node may be greater in the fourth area than in the third area.

In accordance with various embodiments of the present disclosure, the display apparatus may further include a first transistor connected between the second node and the third node, a second transistor connected between the first node and a data voltage line, a third transistor connected between the first node and a high-level drive voltage line, a fourth transistor connected between the third node and a fourth node, a fifth transistor connected between the second node and the initialization voltage line; a sixth transistor connected between the fourth node and a reset line, and a seventh transistor connected between the first node and a bias voltage line.

In accordance with various embodiments of the present disclosure, one of the driving transistor and the first to seventh transistors may be constituted by one of an oxide semiconductor and a low-temperature polysilicon semiconductor or a combination thereof.

In accordance with various embodiments of the present disclosure, the display apparatus may further include an encapsulation member disposed on the driving transistor, and a touch part disposed on the encapsulation member.

In accordance with the present disclosure, the parasitic capacitor Cp of each pixel disposed in a hole area and the parasitic capacitor Cp of each pixel disposed in an area around the hole area are configured to have different capacitances, respectively, and, as such, it may be possible to reduce a load difference between initialization voltage lines. Accordingly, brightness deviation generated between the hole area and the area around the hole area may be reduced.

In accordance with the present disclosure, a defect rate of the display apparatus may be reduced because the brightness deviation between the hole area and the area around the hole area is prevented. Accordingly, production energy for production of the display apparatus may be reduced, and greenhouse gases possibly generated due to a manufacturing process may be reduced. As such, environmental/social/governance (ESG) goals may be achieved.

The present disclosure described above is not limited to the above-described embodiments and the accompanying drawings. Accordingly, it will be understood by those skilled in the art that various substitutions, changes, and modifications may be made without departing from the scope of the disclosure.

What is claimed is:

1. A display apparatus comprising:

a first area comprising a hole;

a second area around the hole; and a pixel in each of the first area and the second area, each pixel comprising:

an initialization voltage line;

a first scan signal line; and a capacitor between the initialization voltage line and the first scan signal line, wherein the capacitor in the first area has a capacitance different from a capacitance of the capacitor in the second area.

2. The display apparatus according to claim 1, wherein the capacitance of the capacitor in the first area is greater than the capacitance of the capacitor in the second area.

3. The display apparatus according to claim 1, wherein an area of the first scan signal line overlapping with a second node is greater in the first area than in the second area, and the second node is connected to one end of the capacitor.

4. The display apparatus according to claim 1, wherein:

the first area comprises a third area and a fourth area around the hole; and the capacitor in the fourth area has a capacitance that is different from a capacitance of the capacitor in the third area.

5. The display apparatus according to claim 4, wherein the capacitance of the capacitor in the fourth area is greater than the capacitance of the capacitor in the third area.

6. The display apparatus according to claim 4, wherein an area of the first scan signal line overlapping with a second node is greater in the fourth area than in the third area, and the second node is connected to one end of the capacitor.

7. A display apparatus comprising:

a first area comprising a hole;

a second area around the hole; and a pixel in each of the first area and the second area, wherein each pixel comprises:

a first scan signal line;

a driving transistor comprising a first node, a second node, and a third node; and a capacitor between the second node and the first scan signal line, wherein the capacitor in the first area has a capacitance different from a capacitance of the capacitor in the second area.

8. The display apparatus according to claim 7, wherein the capacitance of the capacitor in the first area is greater than the capacitance of the capacitor in the second area.

9. The display apparatus according to claim 7, wherein an area of the first scan signal line overlapping with the second node is greater in the first area than in the second area.

10. The display apparatus according to claim 7, wherein:

the first area comprises a third area and a fourth area around the hole; and the capacitor in the third area has a capacitance that is different from a capacitance of the capacitor in the fourth area.

11. The display apparatus according to claim 10, wherein the capacitance of the capacitor in the fourth area is greater than the capacitance of the capacitor in the third area.

12. The display apparatus according to claim 10, wherein an area of the first scan signal line overlapping with the second node is greater in the fourth area than in the third area.

13. The display apparatus according to claim 7, the pixel further comprising:

a first transistor connected to the second node and the third node;

a second transistor connected to the first node and a data voltage line;

a third transistor connected to the first node and a high-level drive voltage line;

a fourth transistor connected to the third node and a fourth node;

a fifth transistor connected to the second node and an initialization voltage line;

a sixth transistor connected to the fourth node and a reset line; and a seventh transistor connected to the first node and a bias voltage line.

14. The display apparatus according to claim 13, wherein at least one of the driving transistor and the first transistor to the seventh transistor includes one of an oxide semiconductor or a low-temperature polysilicon semiconductor or a combination thereof.

15. The display apparatus according to claim 7, further comprising:

an encapsulation member on the driving transistor; and a touch part on the encapsulation member.

16. The display apparatus according to claim 7, wherein in each pixel, the driving transistor is between a substrate and a light emitting element.

* * * * *